US011972246B2

(12) United States Patent
Tone et al.

(10) Patent No.: US 11,972,246 B2
(45) Date of Patent: Apr. 30, 2024

(54) INFORMATION PROCESSING APPARATUS, INFORMATION PROCESSING METHOD, AND RECORDING MEDIUM

(71) Applicant: TOYOTA JIDOSHA KABUSHIKI KAISHA, Toyota (JP)

(72) Inventors: Yuta Tone, Nagoya (JP); Yukinori II, Toyota (JP); Tadayuki Tanaka, Nagoya (JP); Naoki Ishizuka, Nagoya (JP); Yuichiro Yano, Nagakute (JP); Nariaki Amano, Nagoya (JP); Yusuke Maeda, Miyoshi (JP); Kei Yazaki, Okazaki (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 17/720,531

(22) Filed: Apr. 14, 2022

(65) Prior Publication Data
US 2022/0365767 A1 Nov. 17, 2022

(30) Foreign Application Priority Data
May 11, 2021 (JP) .................................. 2021-080647

(51) Int. Cl.
*G06F 8/65* (2018.01)
*G06Q 10/20* (2023.01)
*G07C 5/00* (2006.01)

(52) U.S. Cl.
CPC ............... *G06F 8/65* (2013.01); *G07C 5/008* (2013.01); *G06Q 10/20* (2013.01)

(58) Field of Classification Search
None
See application file for complete search history.

(56) References Cited

U.S. PATENT DOCUMENTS

| 5,951,620 A | 9/1999 | Ahrens et al. |
| 6,018,695 A | 1/2000 | Ahrens et al. |
| 6,131,066 A | 10/2000 | Ahrens et al. |
| 6,289,276 B1 | 9/2001 | Ahrens et al. |
| 10,399,706 B1 * | 9/2019 | Hanlon .................... G06N 5/02 |
| 2002/0010542 A1 | 1/2002 | Ahrens et al. |

(Continued)

FOREIGN PATENT DOCUMENTS

| JP | H1127749 A | 1/1999 |
| JP | 2007-226263 A | 9/2007 |

(Continued)

OTHER PUBLICATIONS

Newcomb, Doug, "The Upsides and Downside of Over-the-Air Software Updates for Automobile Dealers," Wards Auto, https://www.wardsauto.com/dealers/upsides-and-downside-over-air-software-updates-automobile-dealers, Nov. 6, 2020, 5pg. (Year: 2020).*

*Primary Examiner* — Ryan D. Coyer
(74) *Attorney, Agent, or Firm* — Sughrue Mion, PLLC

(57) ABSTRACT

An information processing apparatus includes a processor that: receives, from a user terminal, a request for first update regarding a first vehicle, notifies the user terminal that the first update is to be performed at a shop, when the first update is update of hardware, and notifies the user terminal that the first update is to be performed through wireless communication, when the first update is update of software.

18 Claims, 14 Drawing Sheets

(56) References Cited

U.S. PATENT DOCUMENTS

| | | | |
|---|---|---|---|
| 2016/0321674 A1* | 11/2016 | Lux | G06Q 30/016 |
| 2017/0024201 A1* | 1/2017 | Diedrich | G06F 8/65 |
| 2017/0278312 A1* | 9/2017 | Minster | G05D 1/0297 |
| 2017/0365108 A1* | 12/2017 | Adderly | G07C 5/0808 |
| 2018/0196656 A1* | 7/2018 | Miller | G06F 8/654 |
| 2019/0251759 A1* | 8/2019 | Lora | G06Q 10/0833 |
| 2019/0258467 A1* | 8/2019 | Frantz | G01C 21/3691 |
| 2019/0391800 A1* | 12/2019 | Lin | G06F 8/65 |
| 2020/0133268 A1* | 4/2020 | Walsh | G05D 1/0088 |
| 2020/0348923 A1* | 11/2020 | Mezaael | G06N 5/04 |
| 2021/0191714 A1* | 6/2021 | Ullman | G06F 11/1433 |
| 2021/0224056 A1* | 7/2021 | John | G08G 1/096838 |

FOREIGN PATENT DOCUMENTS

| | | | |
|---|---|---|---|
| JP | 2011081604 A | 4/2011 | |
| JP | 2013125517 A | 6/2013 | |

\* cited by examiner

FIG. 4

MENU INFORMATION DATABASE

| MENU ID | MENU NAME | CORRESPONDING VEHICLE NAME | HARDWARE | SOFTWARE | FEE | AMOUNT OF CHANGE IN APPRAISED VALUE | DESCRIPTION |
|---|---|---|---|---|---|---|---|
| | | | | | | | |
| | | | | | | | |
| | | | | | | | |

USER INFORMATION DATABASE

| USER ID | VEHICLE INFORMATION | | | | |
|---|---|---|---|---|---|
| | VEHICLE ID | VEHICLE NAME | MODEL CODE | BODY COLOR | IN-VEHICLE APPARATUS ID |
| | | | | | |
| | | | | | |
| | | | | | |

*FIG. 6*

SHOP INFORMATION DATABASE

| SHOP ID | SHOP NAME | LOCATION | UPDATABLE MENU ID |
|---------|-----------|----------|-------------------|
|         |           |          |                   |
|         |           |          |                   |
|         |           |          |                   |

```
VEHICLE UPDATE CONFIRMATION SCREEN

DESIRED MENU #1
    UPDATE MENU : MENU A
    HARDWARE UPDATE : Yes
    SOFTWARE UPDATE : Yes
        DATA SIZE : 589 KByte UPDATE FEE : ¥100,000 (JPY)
AMOUNT OF CHANGE IN APPRAISED VALUE :
  +¥300,000 (JPY)
```

⟨SUMMARY OF CURRENT UPDATE⟩
PLACE OF PERFORMANCE OF HARDWARE
UPDATE : SHOP A
SCHEDULED PERFORMANCE DATE :
 (DD/MM/YY)
METHOD OF PERFORMING SOFTWARE
UPDATE : [▼]
         WIRELESS
UPDATE FE SHOP      (JPY)
AMOUNT OF CHANGE IN APPRAISED VALUE :
 +¥300,000 (JPY)

[ CHANGE ]        [ RESERVE ]

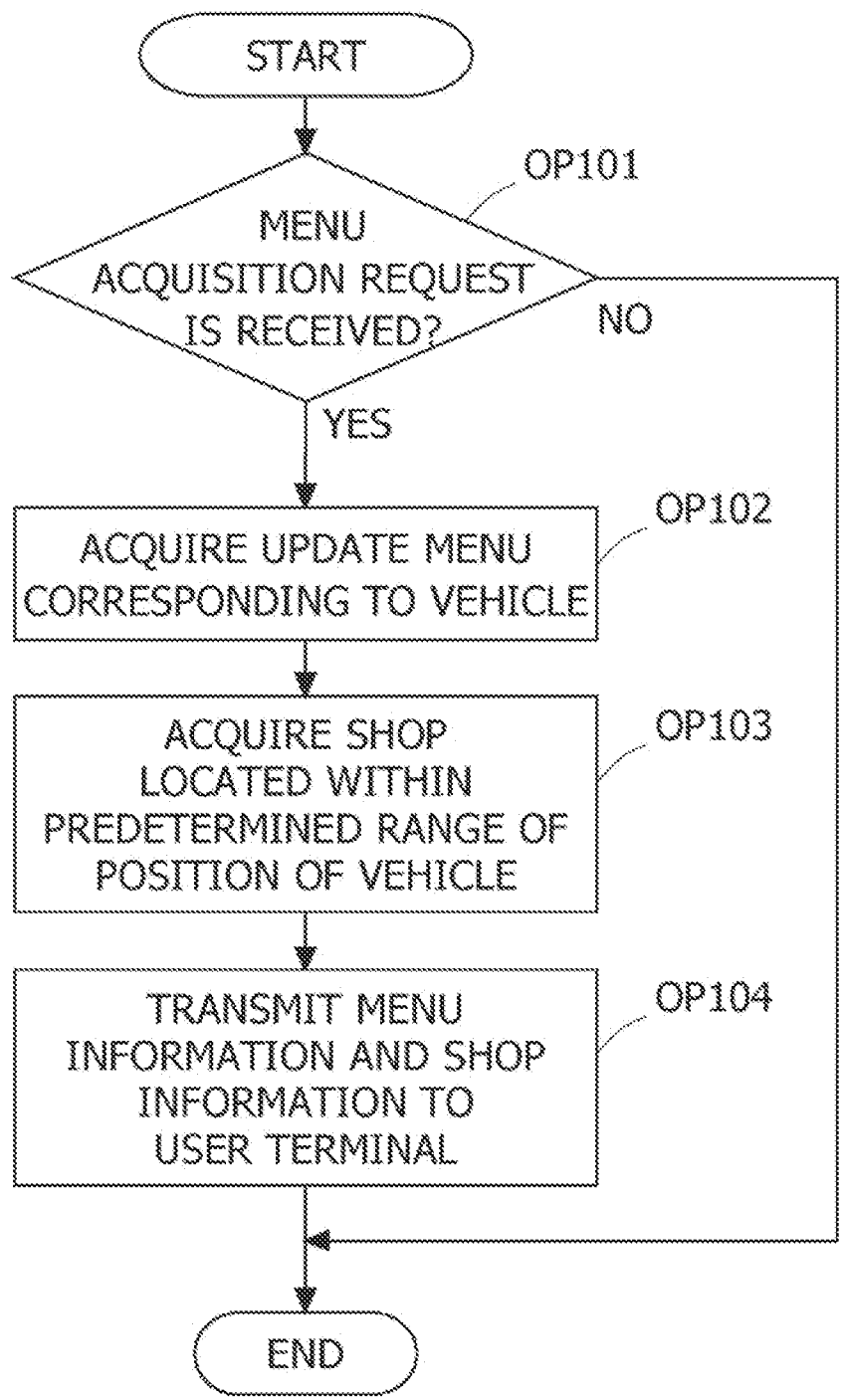

INFORMATION PROCESSING APPARATUS, INFORMATION PROCESSING METHOD, AND RECORDING MEDIUM

CROSS REFERENCE TO THE RELATED APPLICATION

This application claims the benefit of Japanese Patent Application No. 2021-080647, filed on May 11, 2021, which is hereby incorporated by reference herein in its entirety.

BACKGROUND

Technical Field

The present disclosure relates to an information processing apparatus, an information processing method, and a recording medium.

Description of the Related Art

There is disclosed a system that distributes, over a communication link, updated geographical data and updated navigation data that are used by an in-vehicle navigation system (for example, Patent Document 1).

[Patent Document 1] Japanese Patent Laid-Open No 2007-226263

The present disclosure is aimed at providing an information processing apparatus, an information processing method, and a recording medium recording a program that are capable of presenting an update method for a vehicle that is according to contents.

SUMMARY

An aspect of the present disclosure is an information processing apparatus including a processor is configured to:
 receive, from a user terminal, a request for first update regarding a first vehicle,
 notify the user terminal that the first update is to be performed at a shop, when the first update is update of hardware, and
 notify the user terminal that the first update is to be performed through wireless communication, when the first update is update of software.

Another aspect of the present disclosure is an information processing method executed by a computer including:
 receiving, from a user terminal, a request for first update regarding a first vehicle;
 notifying the user terminal that the first update is to be performed at a shop, when the first update is update of hardware; and
 notifying the user terminal that the first update is to be performed through wireless communication, when the first update is update of software.

Another aspect of the present disclosure is a non-transitory computer-readable recording medium recording a program for causing a computer to:
 transmit, to a predetermined server, a request for first update regarding a first vehicle, and
 receive, from the predetermined server, a notification indicating that the first update is to be performed at a shop, when the first update is update of hardware, and a notification indicating that the first update is to be performed through wireless communication, when the first update is update of software.

According to the present disclosure, an update method for a vehicle that is according to contents may be presented.

BRIEF DESCRIPTION OF THE DRAWINGS

FIG. 4 is an example of information held in a menu information database;

FIG. 5 is an example of information held in a user information database;

FIG. 6 is an example of information held in a shop information database;

FIG. 10 is an example of a screen for a case where change of a method of performing update of software is selected;

FIG. 11 is an example of a flowchart of a process performed by a center server in a case where a menu acquisition request is received from a user terminal;

DESCRIPTION OF THE EMBODIMENTS

Figure 1:
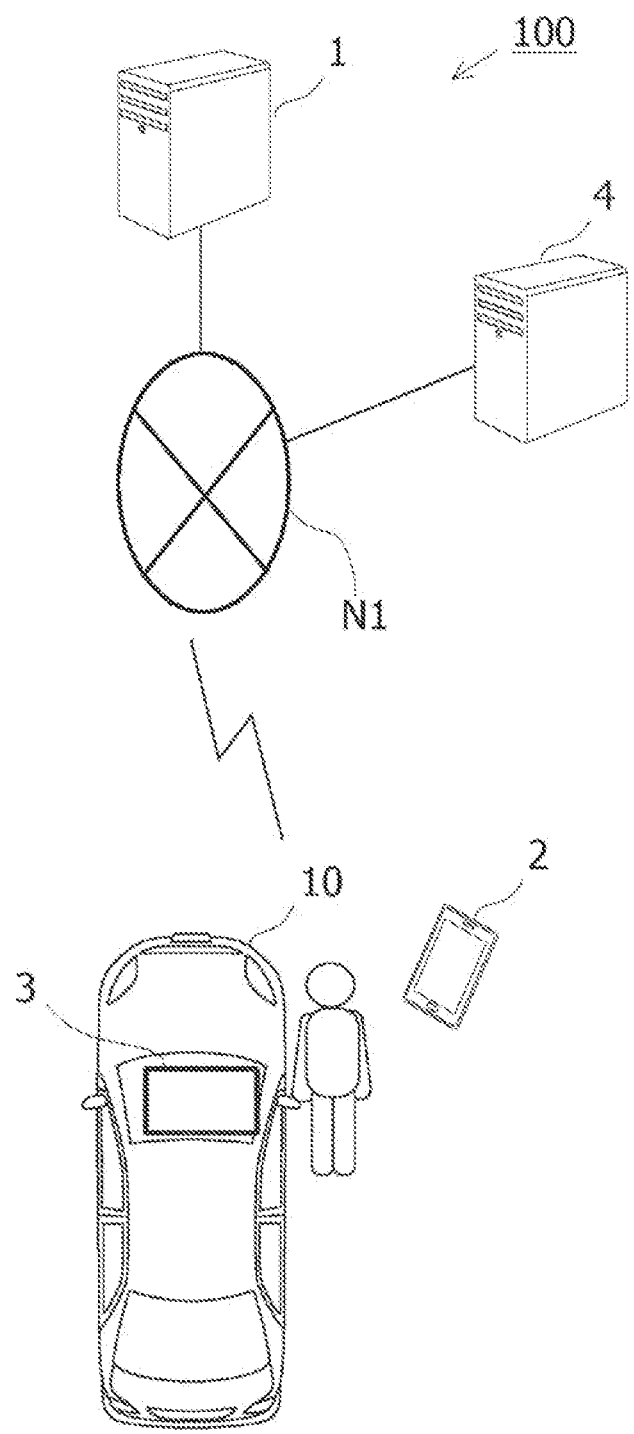
FIG. 1 is a diagram illustrating an example system configuration of a vehicle update system according to a first embodiment.

For example, an appraised value at the time of selling a vehicle is possibly increased by updating hardware of the vehicle. Update of hardware of a vehicle refers to change of an external appearance of the vehicle, change of a structure, addition of a function, and addition and change of hardware to increase performance, for example.

Update of hardware of a vehicle is performed at a shop with predetermined equipment, mechanic and the like, for example. The shop is a dealership, a factory or the like of a manufacturer of the vehicle, for example. With respect to update of software, update can be performed at a shop or through wireless communication in a case where the vehicle includes an apparatus having a wireless communication function. In the case of updating the software through wireless communication, the cost of taking the vehicle to a shop may be saved, for example. Additionally, in the present specification, update of software of a vehicle includes update of software that is already installed in the vehicle, and installation of new software.

An aspect of the present disclosure is an information processing apparatus that includes a processor. The processor may receive, from a user terminal, a request for first update regarding a first vehicle. Furthermore, the processor may notify the user terminal that the first update is to be performed at a shop, when the first update is update of hardware. When the first update is update of software, the processor may notify the user terminal that the first update is to be performed through wireless communication.

The information processing apparatus is a computer such as a server, for example. The processor is a processor such as a central processing unit (CPU), for example. The user terminal is a smartphone, a tablet terminal, or a personal computer (PC), for example. The shop is a dealership, a factory or the like of a manufacturer of the first vehicle, for example.

According to the aspect of the present disclosure, a method of performing update may be presented according to whether update of the first vehicle is for hardware or software.

However, there may also be a wish that update of software to be performed at a shop. For example, such a case may be a case where update of software of a vehicle is to be performed together with update of hardware of the vehicle, and a case where a communication fee will be charged or data traffic will be used. Therefore, according to an aspect of the present disclosure, when the first update includes update of both the hardware and the software, the processor may further allow selection of whether update of one or more pieces of first software included in the first update is to be performed at a shop or through wireless communication. A user of the first vehicle may thus be provided with options regarding update of the software, and the update of software may be performed by a method desired by the user of the first vehicle.

Furthermore, according to an aspect of the present disclosure, the processor may recommend that the update of the one or more pieces of the first software at a shop, when the first update includes update of at least the software and a total amount of data for the update of the one or more pieces of the first software is equal to or greater than a predetermined threshold. When the first update includes the update of at least the software and the total amount of data is smaller than the predetermined threshold, the processor may recommend that the update of the one or more pieces of the first software is to be performed through the wireless communication.

When the total amount of data for the update of the software is equal to or greater than the predetermined threshold, a communication fee for wireless communication may become high, or the amount of data traffic used may increase, or update may take time, for example. According to the aspect of the present disclosure, when the first update includes the update of at least the software, a method of performance that puts less burden on the user may be recommended according to the total amount of data for update of the software.

Furthermore, according to an aspect of the present disclosure, the processor may notify that the update of the one or more pieces of the first software is to be performed at a shop, when the first update includes the update of both the hardware and the software and update of at least one of the one or more pieces of the first software accompanies update of first hardware included in the first update. Furthermore, the processor may recommend that the update of the one or more pieces of the first software is to be performed through the wireless communication, between performed at a shop and performed through wireless communication, when the first update includes the update of both the hardware and the software and update of none of the one or more pieces of the first software accompanies the update of the first hardware.

That update of the software accompanies the update of the hardware means that there is no use for the software if the hardware is not updated. In other words, it means that to use the software, the hardware has to be updated. For example, when update of the software accompanies update of the hardware, there is no use for the software even if the software is updated through wireless communication before update of the hardware. Therefore, according to the aspect of the present disclosure, when update of the software accompanies update of the hardware, the update of the software is performed at a shop together with update of the hardware. This saves the user of the first vehicle a burden related to update of the first vehicle.

Furthermore, according to an aspect of the present disclosure, the processor may recommend that the update of the one or more pieces of the first software at a shop, when the first update includes the update of both the hardware and the software and a schedule of a first shop where the first update is scheduled to be performed allows the first update to be performed within a predetermined number of days from a date specified by the user terminal. Furthermore, the processor may recommend that the update of the one or more pieces of the first software is to be performed through the wireless communication, when the first update incudes the update of both the hardware and the software and the schedule of the first shop is not available until after the predetermined number of days from the date specified by the user terminal.

When the schedule of the first shop is not available, it may be more convenient for the user if update of the software is performed in advance through the wireless communication because this may allow a service of the software to be more swiftly received. According to the aspect of the present disclosure, a method of performing update of the software of a vehicle may be presented according to the schedule of the first shop.

According to an aspect of the present disclosure, the processor may recommend that the update of the one or more pieces of first software is to be performed at a shop, when the first update includes the update of both the hardware and the software and at least one of cases is satisfied. The cases includes (1) a case where update of at least one of the one or more pieces of the first software accompanies update of first hardware included in the first update, (2) a case where the first update is possible to be performed within a predetermined number of days from a date specified by the user terminal, and (3) a case where a total amount of data for update of the one or more pieces of the first software is equal to or greater than a predetermined threshold. This allows a method of performing update of the software to be flexibly presented according to contents of the first update.

According to an aspect of the present disclosure, when the first update includes the update of both the hardware and the software and there is more than one piece of the first software, the processor may determine whether to recommend that update is to be performed at a shop or through the wireless communication, with respect to each of the more than one piece of the first software. A recommended method of performing update of the software may thus be flexibly determined for each of a plurality of pieces of the first software included in the first update.

Furthermore, according to an aspect of the present disclosure, hardware to be added or changed by the first update may come with a warranty from a manufacturer of the first vehicle. Normally, hardware of a vehicle that is added or changed by the user himself/herself is often not warranted by the manufacturer, but update of hardware of the first vehicle may be encouraged when an updated component is warranted by the manufacturer.

According to an aspect of the present disclosure, the processor may transmit, to the user terminal, information about an appraised value of the first vehicle after performing of the first update. The information about an appraised value of the first vehicle after update is the appraised value of the first vehicle after update, or an amount of change in the appraised value of the first vehicle due to update, for example. According to the aspect of the present disclosure, the user of the first vehicle may determine whether to perform the first update, based on the information about the appraised value after update.

According to an aspect of the present disclosure, the processor may transmit, to the user terminal, information about a fee for the first update. The user may thus determine whether to perform the first update, and whether to change contents of the first update.

When update of the software is included in the first update, a total amount of data for the update of the one or more pieces of the first software included in the first update may be transmitted to the user terminal. This allows the user of the first vehicle to grasp the amount of data for update of the software of the first vehicle. For example, when a method of performance through wireless communication and a method of performance at a shop are presented as methods of performing update of the software of the first vehicle, the method of update of the software may be selected based on the amount of data for update.

Another aspect of the present disclosure may be given as an information processing method by which the information processing apparatus described above performs the processes described above. Still other aspects of the present disclosure may be given as a program for causing a computer to perform the processes of the information processing apparatus described above, and a non-transitory computer-readable recording medium storing the program.

Furthermore, another aspect of the present disclosure is a non-transitory computer-readable recording medium storing a program for causing a computer to: transmit, to a predetermined server, a request for first update regarding a first vehicle, and receive, from the predetermined server, a notification indicating that the first update is to be performed at a shop, when the first update is update of hardware, and a notification indicating that the first update is to be performed through wireless communication, when the first update is update of software. For example, the computer is a user terminal that is used by the user of the first vehicle. For example, the user terminal is a smartphone, a tablet terminal, or a PC.

In the following, embodiments of the present disclosure will be described with reference to the drawings. The configuration of the embodiments described below are examples, and the present disclosure is not limited to the configuration of the embodiments.

First Embodiment

FIG. 1 is a diagram illustrating an example system configuration of a vehicle update system 100 according to a first embodiment. The vehicle update system 100 is a system that provides update of hardware and software of a vehicle. The vehicle update system 100 includes a center server 1, a user terminal 2, an in-vehicle apparatus 3 that is mounted in a vehicle 10, and a shop server 4. Although a plurality of user terminals 2, in-vehicle apparatuses 3 and shop servers 4 are included in the vehicle update system 100, one each is illustrated in FIG. 1 for the sake of convenience. The center server 1 is an example of "information processing apparatus". The vehicle 10 is an example of "first vehicle". The user terminal 2 is an example of "user terminal".

The center server 1, the user terminal 2, the in-vehicle apparatus 3, and the shop server 4 are connected to a network N1, and are capable of communication over the network N1. The network N1 is the Internet, for example.

The center server 1 is a server that is managed by a manufacturer of the vehicle 10, for example. The shop server 4 is a server that manages a dealership, a factory or maintenance facility managed by the manufacturer of the vehicle 10, for example. The vehicle 10 is brought to a shop at a time of update of hardware or software, repair and inspection of the vehicle 10, for example.

The in-vehicle apparatus 3 is mounted in the vehicle 10. The in-vehicle apparatus 3 includes a wireless communication function. The vehicle 10 is a vehicle that is a so-called connected car. For example, the user terminal 2 is a user terminal that is used by a user who is registered in the vehicle update system 100 as an owner of the vehicle 10. For example, the user terminal 2 is a smartphone, a tablet terminal, or a PC. The user terminal 2 may be the in-vehicle apparatus 3. A client application program of the vehicle update system 100 is installed in the user terminal 2.

In the first embodiment, update of hardware of the vehicle 10 refers to change of an external appearance of the vehicle 10, change of a structure, addition of a function, and addition and change of hardware to increase performance, for example. More specifically, update of hardware related to change of the external appearance of the vehicle 10 is change of a body color, for example. Update of hardware related to change of the structure of the vehicle 10 is change in the number of seats, addition of a sunroof, change to an automatic sliding door, or the like, for example. Additionally, specific examples of update of hardware of the vehicle are not limited to those mentioned above.

Update of hardware related to addition of a function to the vehicle 10 is addition of a device, a sensor or a component related to an advanced safety function, for example. The advanced safety function is an anti-lock brake system (ABS), an electronic stability control device, a parking assist system, a lane assist device, a wandering alert system, or an adaptive cruise control (ACC) device, for example. Update for increasing performance of the vehicle 10 is addition or replacement of a sensor or a component for increasing performance related to the advance safety function described above, replacement of an engine or a motor, or change to a battery with a greater capacity in the case where the vehicle 10 is an electric vehicle, for example.

In the first embodiment, update of hardware of the vehicle 10 that is handled by the vehicle update system 100 is for increasing performance and value of the vehicle 10, satisfaction and convenience of the owner of the vehicle 10, and the like. For example, repair to restore the vehicle 10 to an original state, arising due to breakdown, is not included in the update of hardware of the vehicle 10 that is handled by the vehicle update system 100. In contrast, repair of hardware that increases value or performance of the vehicle 10 compared to the original state may be included in the update of hardware of the vehicle 10 that is handled by the vehicle update system 100 even when such repair is due to breakdown. In the first embodiment, the vehicle update system 100 provides a warranty of the manufacturer of the vehicle 10 in relation to updated hardware. Additionally, update of hardware of the vehicle 10 is not limited to the examples described above.

In the first embodiment, update of software of the vehicle 10 is update of software related to control of apparatuses, components and the like mounted in the vehicle 10, update of application software installed in an apparatus mounted in the vehicle 10, and addition of new software to add a new function, for example.

Update of software of the vehicle 10 may be performed through wireless communication by the in-vehicle apparatus 3, without taking the vehicle 10 to a shop. However, in the case where the amount of data for update is great, the user may want to perform update of software of the vehicle 10 at a shop to avoid a communication fee for wireless communication or use of data traffic, for example. In the case where both hardware and software are to be updated, it is more efficient to update the two at a shop. Moreover, with respect to software accompanying hardware, if the hardware is not updated, the software is possibly not usable even when the software is updated, for example.

As described above, even in a case where update of software can be performed through wireless communication, it is sometimes more desirable to update the software at a shop. Accordingly, the center server 1 according to the first embodiment presents a method of performing update according to contents of update of the vehicle 10. Additionally, in the first embodiment, the method of performing update of the vehicle 10 is performance at a shop or performance through wireless communication.

More specifically, in the first embodiment, the user of the vehicle 10 activates the client application program of the vehicle update system 100 on the user terminal 2, and transmits an update request requesting update of the vehicle 10 to the center server 1 through the user terminal 2. In the first embodiment, the user of the vehicle 10 is assumed to be a user who is registered in the vehicle update system 100 as the owner of the vehicle 10.

When the update request is received from the user terminal 2, the center server 1 presents a method of performing update to the user terminal 2 according to contents of update of the vehicle 10. For example, in the case where update of the vehicle 10 is update of just hardware, the center server 1 presents, to the user terminal 2, performance at a shop as the method of performing update. For example, in the case where update of the vehicle 10 is update of just software, the center server 1 presents, to the user terminal 2, performance through wireless communication as the method of performing update.

Furthermore, update of the vehicle 10 may include update of both hardware and software. In this case, the center server 1 determines the method of performing update of software to be presented, according to at least one of the amount of data for update, whether the software accompanies the hardware or not, and a schedule of the shop.

In the case where performance at a shop is selected by the user of the user terminal 2 as the method of performing update, the center server 1 makes a reservation for update at the shop server 4 of a shop that is specified by the user as the shop where update is to be performed.

Accordingly, in the first embodiment, a system that provides update of hardware and software of the vehicle 10 may present the method of performing update according to contents of update of the vehicle 10.

Figure 2:
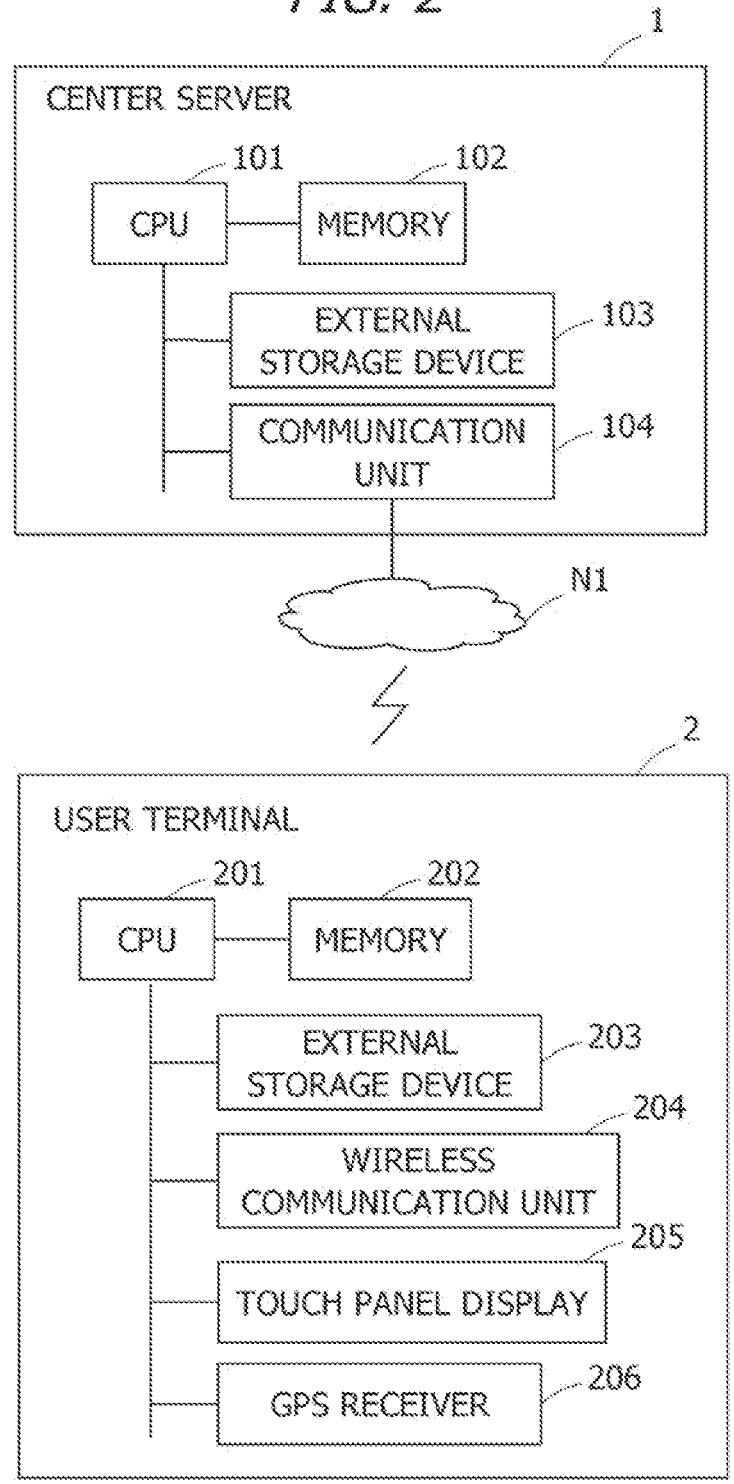
FIG. 2 is an example of hardware configurations of a center server and a user terminal.

FIG. 2 illustrates example hardware configurations of the center server 1 and the user terminal 2. As hardware components, the center server 1 includes a CPU 101, a memory 102, an external storage device 103, and a communication unit 104. The memory 102 and the external storage device 103 are computer-readable recording media.

The external storage device 103 stores various programs, and data to be used by the CPU 101 at the time of execution of each program. For example, the external storage device 103 is an erasable programmable ROM (EPROM) or a hard disk drive. Programs to be held in the external storage device 103 include an operating system (OS), a control program of the vehicle update system 100, and various other application programs, for example.

The memory 102 is a main memory that provides the CPU 101 with a work area and a storage area where programs stored in the external storage device 103 are loaded, and that is used as a buffer, for example. The memory 102 includes semiconductor memories such as a read only memory (ROM) and a random access memory (RAM), for example.

The CPU 101 performs various processes by loading the OS and various other application programs held in the external storage device 103 into the memory 102 and by executing the same. The number of CPUs 101 is not limited to one and may be more than one. The CPU 101 is an example of "controller".

The communication unit 104 is a local area network (LAN) or a cable network card such as a dedicated line, and connects to the network N1 through an access network such as the LAN, for example. The hardware configuration of the center server 1 is not limited to the one illustrated in FIG. 2.

As hardware components, the user terminal 2 includes a CPU 201, a memory 202, an external storage device 203, a wireless communication unit 204, a touch panel display 205, and a global positioning system (GPS) receiver 206, for example. Additionally, in FIG. 2, hardware related to the vehicle update system 100 is extracted and displayed as the hardware configuration of the user terminal 2, and the hardware configuration of the user terminal 2 is not limited to the one illustrated in FIG. 2.

The CPU 201, the memory 202, and the external storage device 203 are similar to the CPU 101, the memory 102, and the external storage device 103, respectively, and redundant description is omitted. The client application program of the vehicle update system 100 is stored in the external storage device 203.

The wireless communication unit 204 is a wireless communication circuit compatible with a mobile communication method such as 5th Generation (5G), long term evolution (LTE), LTE-Advanced or 3G, or with a wireless communication method such as WiFi, for example. The wireless communication unit 204 connects to an access network through wireless communication, and connects to the network N1 through the access network.

The touch panel display 205 is an example of an input device and an output device. For example, a user operation is input to the touch panel display 205, and contents of the user operation are output to the CPU 201. Furthermore, the touch panel display 205 displays image data according to an instruction from the CPU 201.

The GPS receiver 206 receives a signal from a GPS satellite, and acquires position information by using time information included in the signal. The position information that is acquired by the GPS receiver 206 is latitude and longitude, for example. The GPS receiver 206 acquires the position information every predetermined period of time during operation of the GPS receiver 206. The hardware configuration of the user terminal 2 is not limited to the one illustrated in FIG. 2.

As hardware components, the in-vehicle apparatus 3 includes a CPU, a memory, an external storage device, a wireless communication unit, and an interface for connecting to a controller area network (CAN). The CPU, the memory, the external storage device, and the wireless communication unit of the in-vehicle apparatus 3 are similar to the CPU 101, the memory 102, the external storage device 103, and the wireless communication unit 204, respectively. The in-vehicle apparatus 3 receives update data for software through wireless communication, and performs update of software for each device in the vehicle 10 through the CAN.

Figure 3:
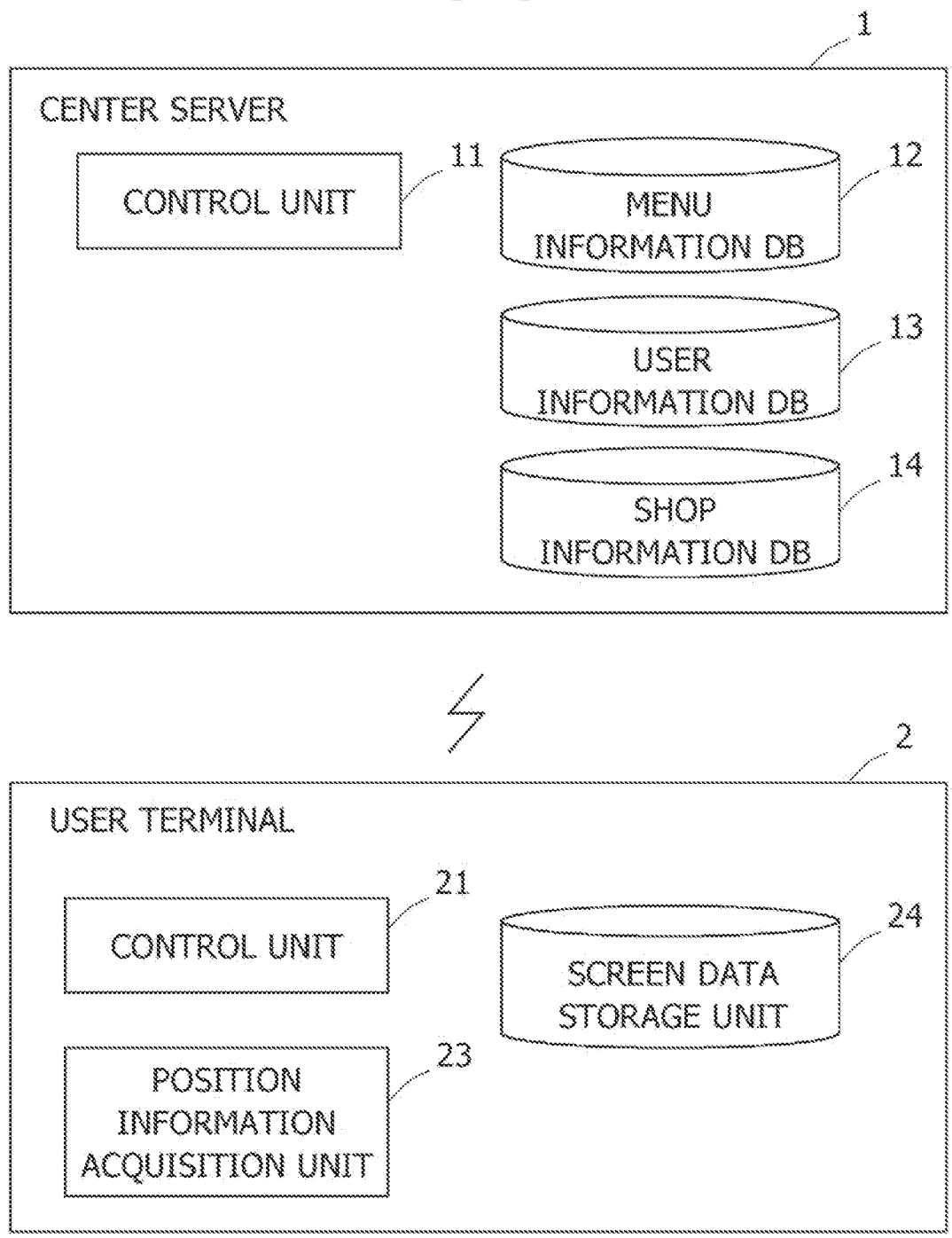
FIG. 3 is a diagram illustrating example functional configurations of a center server and a user terminal.

FIG. 3 is a diagram illustrating example functional configurations of the center server 1 and the user terminal 2. As functional components, the user terminal 2 includes a control unit 21, a position information acquisition unit 23, and a screen data storage unit 24. These functional elements are implemented by the CPU 201 of the user terminal 2 executing the client application program of the vehicle update system 100, for example.

The control unit 21 performs display control for the touch panel display 205, and control of communication with the center server 1. For example, when a client application of the vehicle update system 100 is activated by input of a user operation to the user terminal 2, the control unit 21 transmits a menu acquisition request to the center server 1. The menu acquisition request is a message requesting acquisition of an update menu corresponding to the vehicle 10. User identification information of the user of the vehicle 10 and position information of the vehicle 10 are also transmitted to the center server 1 together with the menu acquisition request. In the first embodiment, the position information of the user terminal 2 acquired from the position information acquisition unit 23 is used as the position information of the vehicle 10.

As a response to the menu acquisition request, the control unit 21 receives, from the center server 1, menu information about an update menu corresponding to the vehicle 10, and shop information about a shop that is located within a predetermined range of the vehicle 10, for example. The menu information is information about an update menu, and includes identification information of a menu, a description of the menu, and the like, for example. The shop information is information about a shop, and includes identification information of the shop, position information of the shop, identification information of an update menu that can be handled at the shop, and the like, for example.

When the menu information about the update menu corresponding to the vehicle 10, and the shop information about a shop that is located within the predetermined range of the vehicle 10 are received from the center server 1, the control unit 21 displays a vehicle update menu screen. The vehicle update menu screen is a screen that displays the update menu corresponding to the vehicle 10. For example, the vehicle update menu screen includes the menu information about the update menu corresponding to the vehicle 10, and the shop information about a shop that is located within the predetermined range of the vehicle 10, for example.

In the case where an update menu that is desired by the user to be performed and the like are selected and a user operation for update confirmation request are input to the vehicle update menu screen, the control unit 21 transmits the update confirmation request to the center server 1. The update confirmation request is a message requesting acquisition of detailed information about update. For example, the user identification information of the user of the vehicle 10, the identification information of the update menu selected by the user, the identification information of a shop that is selected as the shop where update is to be performed, a desired reservation date and the like are also transmitted to the center server 1 together with the update confirmation request. In the following, the update menu that is desired by the user to be performed will be referred to as "desired menu", and the shop that is selected as the shop where update is to be performed will be referred to as "desired shop". Additionally, a plurality of desired menus may be selected. In contrast, in the first embodiment, one shop is to be selected as the desired shop. However, such a case is not restrictive, and selection of a plurality of desired shops may also be allowed. Update of the vehicle 10 according to the desired menu is an example of "first update regarding a first vehicle". The desired shop is an example of "first shop".

As a response to the update confirmation request, the control unit 21 receives, from the center server 1, the detailed information about update of the vehicle 10 and identification information of an update request. For example, the detailed information about update includes menu information about the desired menu, a method of performing update of hardware and/or software included in the desired menu, the shop information about the desired shop, information about a scheduled performance date of update of hardware and/or software, and the like.

The menu information about the desired menu that is received includes information about whether to update hardware or not, whether to update software or not, information about an appraised value of the vehicle 10 based on update, an amount of data for update of software in a case where update of software is included, a fee for update, and the like. The control unit 21 displays the detailed information about update of the vehicle 10 on a vehicle update confirmation screen.

For example, when a user operation for a reservation request for update is input through the vehicle update confirmation screen, the control unit 21 transmits the reservation request for update to the center server 1. For example, the user identification information of the user of the vehicle 10 and the identification information of the update request are also transmitted to the center server 1 together with the reservation request for update. When a reservation for the shop or the like is made by the center server 1 and a reservation for update is established, for example, the control unit 21 receives, from the center server 1, a notification indicating reservation establishment as a response to the reservation request.

When an input of an instruction to acquire position information is received from the control unit 21, the position information acquisition unit 23 outputs the position information acquired by the GPS receiver 206 to the control unit 21.

The screen data storage unit 24 is created in a storage area in the external storage device 203. For example, the screen data storage unit 24 holds screen data of the vehicle update menu screen and the vehicle update confirmation screen. Details of processes by the control unit 21, and details of the vehicle update menu screen and the vehicle update confirmation screen will be given later.

Next, as functional components, the center server 1 includes a control unit 11, a menu information DB 12, a user information DB 13, and a shop information DB 14. These functional components are implemented by the CPU 101 of the center server 1 executing the control program of the vehicle update system 100 stored in the external storage device 103, for example.

The control unit 11 acquires, from the user terminal 2, the menu acquisition request, the update confirmation request, and an update reservation request, for example. In the case where the menu acquisition request is received from the user terminal 2, the control unit 11 acquires the update menu corresponding to the vehicle 10. The specific process of acquiring the update menu corresponding to the vehicle 10 is as described below.

First, the user identification information of the user of the vehicle 10 and the position information of the vehicle 10 are received together with the menu acquisition request. The control unit 11 acquires, from the user information DB 13, vehicle information that is associated with the received user identification information. For example, the vehicle information includes identification information, a vehicle name, a model code, a body color and the like of the vehicle 10. For example, the control unit 11 acquires, from the menu information DB 12, information about an update menu corresponding to the vehicle name, the model code and the like of the vehicle 10 as the menu information about the update menu corresponding to the vehicle 10.

Furthermore, the control unit 11 acquires, from the shop information DB 14, information about a shop that is located within a predetermined range of the vehicle 10. For example, the predetermined range where a shop is to be identified is a range of a predetermined distance from the position information of the vehicle 10, a same area as the position information of the vehicle 10, or a range where one can travel by a vehicle from the position information of the vehicle 10 within a predetermined period of time. The control unit 11 transmits, to the user terminal 2, as a response to the menu acquisition request, the menu information about the update menu corresponding to the vehicle 10 and the shop information about a shop that is located within the predetermined range of the vehicle 10.

In the case where the update confirmation request is received from the user terminal 2, the control unit 11 acquires detailed information about update related to performance of the desired menu. The specific process of acquiring the detailed information about update related to performance of the desired menu is as described below.

For example, the user identification information of the user of the vehicle 10, the identification information of the desired menu, the identification information of the desired shop, the desired reservation date and the like are also received from the user terminal 2 together with the update confirmation request. The detailed information about update includes the menu information about the desired menu, the shop information about the desired shop, a scheduled performance date of update, and the method of performing update of software in a case where update of software is included, for example. The control unit 11 acquires the menu information about the desired menu from the menu information DB 12. The control unit 11 acquires the shop information about the desired shop from the shop information DB 14.

The control unit 11 acquires the menu information corresponding to the identification information of the desired menu from the menu information DB 12, and determines whether the desired menu includes update of hardware or software.

In the case where the desired menu includes update of at least hardware, the control unit 11 checks the schedule of the desired shop. For example, the schedule of the desired shop is acquired through inquiry to the shop server 4 of the desired shop. The control unit 11 determines whether the schedule of the desired shop allows a reservation for update of the vehicle 10 on the desired reservation date to be made or not.

In the case where the desired menu includes update of at least hardware and the schedule of the desired shop allows a reservation for update of the vehicle 10 on the desired reservation date to be made, the control unit 11 takes the desired reservation date to be the scheduled performance date. In the case where the schedule of the desired shop does not allow a reservation for update of the vehicle 10 on the desired reservation date to be made, the control unit 11 picks out, from the schedule of the desired shop, a plurality of dates that can be reserved around the desired reservation date, for example. The control unit 11 takes the picked-out plurality of dates that can be reserved around the desired reservation date as reservable dates to be given as one detailed information piece about update.

In the case where the desired menu includes update of at least software, the control unit 11 determines a method to be presented as the method of performing update of software. For example, in the case where update included in the desired menu is just for software, the control unit 11 determines that a method of performance through wireless communication is to be presented as the method of performing update of software. In this case, the control unit 11 allows the desired reservation date or any date to be the scheduled performance date.

However, cases described above are not restrictive, and in the case where update included in the desired menu is just for software, the control unit 11 may determine to present a method of performance at a shop and the method of performance through wireless communication as the methods of performing update of software. Furthermore, in the case where update included in the desired menu is just for software, the method of performing update of software to be recommended may be determined based on a data size for update. The data size for update is the amount of data for all the update of software included in the desired menu. In the case where the data size for update is equal to or greater than a predetermined threshold, the control unit 11 may determine the method of performance at a shop as the method of performing update of software to be recommended. In the case where the data size for update is smaller than the predetermined threshold, the control unit 11 may determine the method of performance through wireless communication as the method of performing update of software to be recommended.

For example, in the case where update included in the desired menu is for both hardware and software, the control unit 11 may determine to present options including performance at a shop and performance through wireless communication as the methods of performing update of software.

For example, in the case where update included in the desired menu is for both hardware and software, the control unit 11 may determine the method to be presented as the method for performing update of software based on at least one of whether update of software accompanying update of hardware is included or not, whether a reservation may be made within a predetermined number of days from the desired reservation date or not, and whether the amount of data for update is equal to or greater than a predetermined threshold or not. The control unit 11 may determine performance at a shop as the method of performing update of software to be presented or recommended, in the case where a positive determination is made in at least one of the cases described above. Additionally, with respect to presentation of the method of performing update of software, when a plurality of methods are to be presented, the plurality of methods are not ranked. In contrast, recommendation of a predetermined method of performing update of software means that one of a plurality of methods is prioritized.

For example, in the case where update of both hardware and software is included in the desired menu and update of software accompanying update of hardware is included, the control unit 11 may determine to present performance at a shop as the method of performing update of software. This is because, in the case where update of software accompanying update of hardware is included in the desired menu, there is no use for the software if the software is updated through wireless communication before the hardware. In the case where update of both hardware and software is included in the desired menu and update of software accompanying update of hardware is not included, the control unit 11 may determine to present both performance at a shop and performance through wireless communication as the methods of performing update of software.

For example, in the case where update included in the desired menu is for both hardware and software and a reservation may be made at the desired shop within a predetermined number of days from the desired reservation date, the control unit 11 may determine to recommend performance at a shop as the method of performing update of software. In the case where update included in the desired menu is for both hardware and software and it is not possible to make a reservation at the desired shop within the predetermined number of days from the desired reservation date, the control unit 11 may determine to recommend performance through wireless communication as the method of performing update of software.

For example, in the case where update included in the desired menu is for both hardware and software and the amount of data for update is equal to or greater than a predetermined threshold, the control unit 11 may determine to recommend performance at a shop as the method of performing update of software. In the case where update included in the desired menu is for both hardware and software and the amount of data for update is smaller than the predetermined threshold, the control unit 11 may determine to recommend performance through wireless communication as the method of performing update of software.

The control unit 11 assigns identification information to detailed information for update that is created in response to reception of the update confirmation request, and temporarily saves the identification information and the detailed information about update in the memory 102, for example. As a response to the update confirmation request, the control unit 11 transmits, to the user terminal 2, detailed information about update related to performance of the desired menu and identification information of the detailed information about update.

Next, the control unit 11 receives, from the user terminal 2, the reservation request for update. The user identification information of the user of the vehicle 10 and the identification information of the detailed information about update are also received together with the reservation request for update, for example. The control unit 11 refers to the detailed information about update corresponding to the identification information that is received, and makes a reservation for update of the vehicle 10 at the shop server 4 of the desired shop in a case where performance at a shop is set as the method of performing update. When the reservation for update of the vehicle 10 is established, the control unit 11 transmits, to the user terminal 2, a notification indicating reservation establishment as a response to the reservation request for update.

Additionally, in the case where update of the vehicle 10 includes update of a plurality of pieces of software, the method of performing update of software to be presented or recommended may be determined for each piece of software.

The menu information DB 12, the user information DB 13, and the shop information DB 14 are created in a storage area of the external storage device 103. The menu information DB 12 holds information about an update menu. The user information DB 13 holds information about a user. The shop information DB 14 holds information about a shop. Details of information pieces held in the menu information DB 12, the user information DB 13, and the shop information DB 14 will be given later. Additionally, the functional configurations of the center server 1 and the user terminal 2 are not limited to the examples illustrated in FIG. 3.

FIG. 4 is an example of information held in the menu information DB 12. The menu information DB 12 holds information about an update menu. In the example illustrated in FIG. 4, one record in the menu information DB 12 includes fields of menu ID, menu name, corresponding vehicle name, hardware, software, fee, amount of change in appraised value, and description.

The identification information of an update menu is stored in the field "menu ID". The name of the update menu is stored in the field "menu name". The vehicle name of the vehicle corresponding to the update menu is stored in the field "corresponding vehicle name". Additionally, in addition to the vehicle name of the vehicle corresponding to the update menu, information for identifying the type of the vehicle, such as a model code, a model name and a grade, may be included in the field "corresponding vehicle name".

Information about hardware included in the update menu is stored in the field "hardware". For example, identification information, product name, the number of pieces, and performance of the hardware and, in the case of hardware to be added, information indicating addition of the component are stored in the field "hardware" as the information about hardware. In the case where a plurality of pieces of hardware are included in the update menu, information is stored in the field "hardware" for each piece of hardware.

Information about software included in the update menu is stored in the field "software". For example, name, version, and the data size of software to be added or updated, and information indicating whether the software accompanies hardware or not are stored in the field "software" as the information about software. In the case where a plurality of pieces of software are included in the update menu, information is stored in the field "software" for each piece of software.

Fee for the update menu is stored in the field "fee". An amount of change in the appraised value of the vehicle after performance of the update menu is stored in the filed "amount of change in the appraised value". The amount of change in the appraised value of the vehicle after performance of the update menu is an example of "information about an appraised value of the first vehicle after performing the first update". A description of the update menu is stored in the field "description".

Information to be held in the menu information DB 12 is registered in advance by an administrator of the vehicle update system 100. One record in the menu information DB 12 corresponds to the menu information for one update menu. Additionally, information pieces to be held in the menu information DB 12 are not limited to those illustrated in FIG. 4.

FIG. 5 is an example of information held in the user information DB 13. For example, the user information DB 13 holds an association between the user and the vehicle 10. One record in the user information DB 13 illustrated in FIG. 5 includes fields of user ID and vehicle information. User identification information is stored in the field "user ID". The user identification information is assigned to each user in the vehicle update system 100 to identify the user.

Information about the vehicle 10 is stored in the field "vehicle information". Specifically, the field "vehicle information" includes subfields of vehicle ID, vehicle name, model code, body color, and in-vehicle apparatus ID. Identification information of the vehicle 10 is stored in the subfield "vehicle ID". The identification information of the vehicle 10 is identification information assigned to identify the vehicle 10 in the vehicle update system 100 or identification information on a license plate, for example.

Information indicating the vehicle name of the vehicle 10 is stored in the subfield "vehicle name". Information indicating the model code of the vehicle 10 is stored in the subfield "model code". Information indicating the body color of the vehicle 10 is stored in the subfield "body color". Identification information of the in-vehicle apparatus 3 is stored in the subfield "in-vehicle apparatus ID".

Information to be held in the user information DB 13 is registered in advance. Information pieces to be held in the user information DB 13 illustrated in FIG. 5 are merely examples, and information pieces to be held in the user information DB 13 are not limited to those illustrated in FIG. 5.

FIG. 6 is an example of information held in the shop information DB 14. The shop information DB 14 holds information about a shop. One record in the shop information DB 14 illustrated in FIG. 6 includes fields of shop ID, shop name, location, and updatable menu ID.

Identification information of a shop is stored in the field "shop ID". The name of the shop is stored in the field "shop name". Information indicating a location of the shop is stored in the field "location". Information indicating a location of the shop is latitude and longitude, or an address, for example. Identification information pieces of all the update menus that can be handled at the shop are stored in the field "updatable menu ID". That handling at a shop is possible means that equipment and staff for handling the update menu are present in the shop.

Information to be held in the shop information DB 14 is registered in advance. One record in the shop information DB 14 corresponds to the shop information of one shop. Additionally, information pieces to be held in the shop information DB 14 illustrated in FIG. 6 are merely examples, and information pieces to be held in the shop information DB 14 are not limited to those illustrated in FIG. 6.

Figure 7:
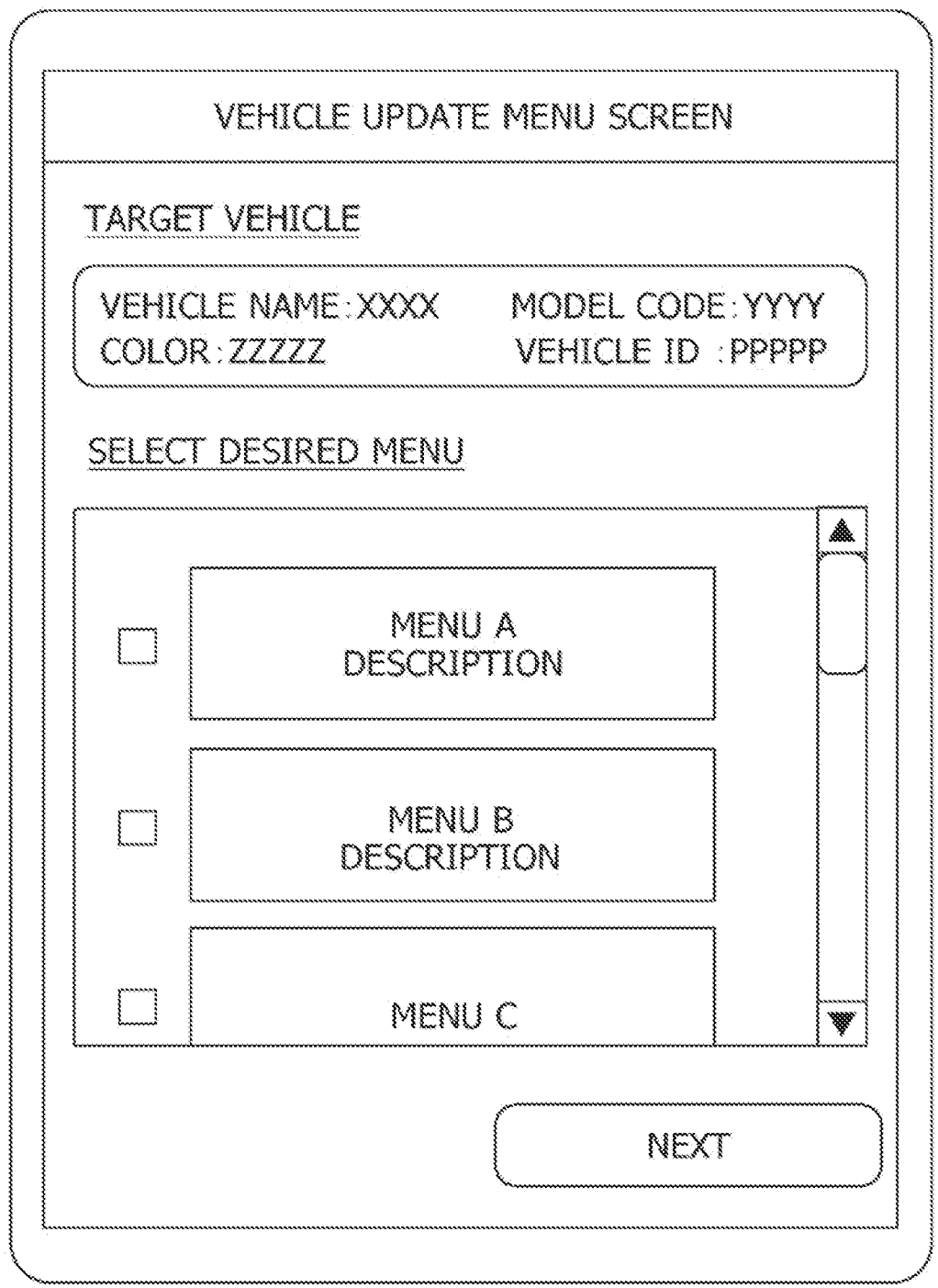
FIG. 7 is an example of a vehicle update menu screen.
Figure 8:
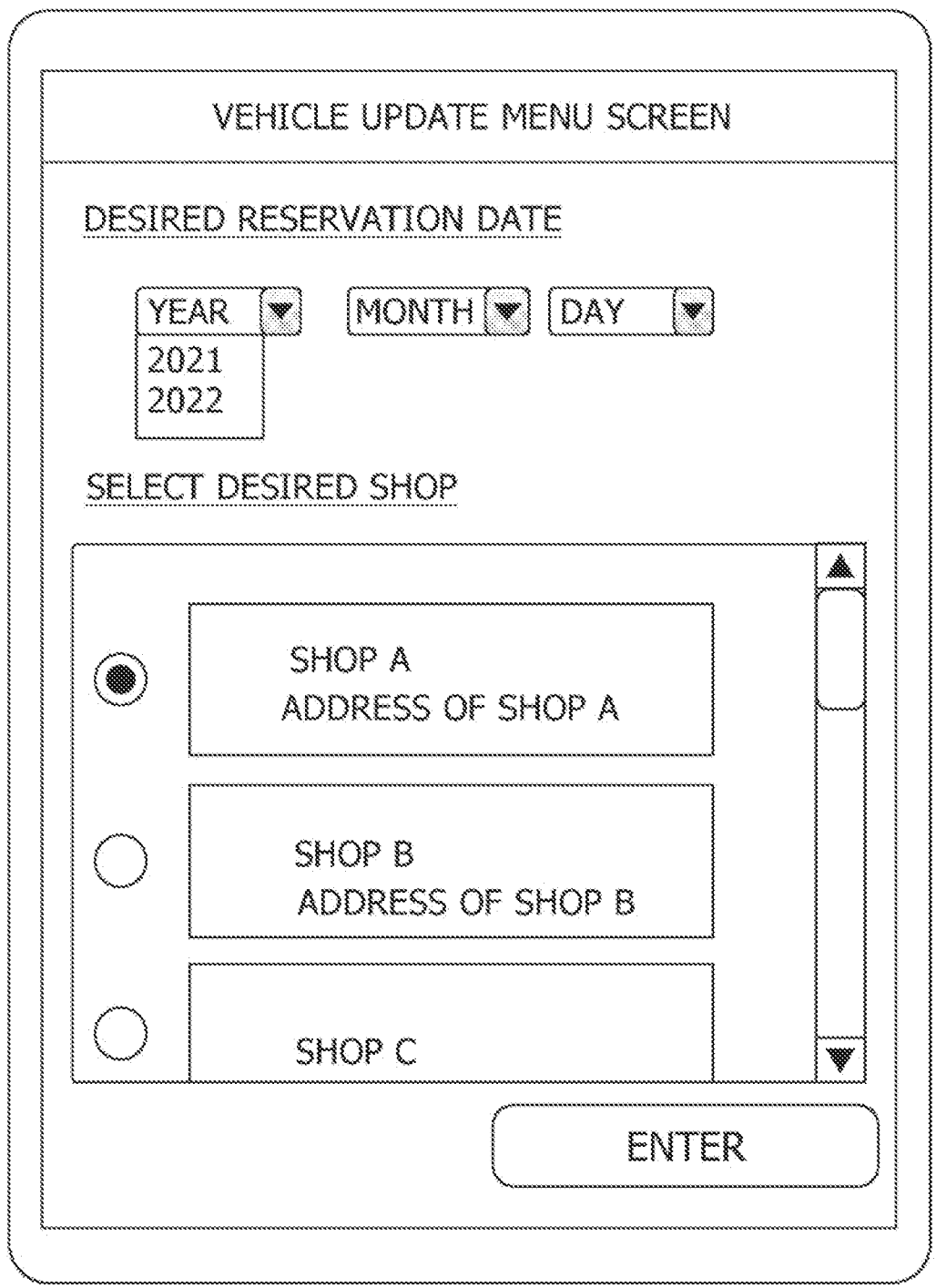
FIG. 8 is an example of a vehicle update menu screen.

FIGS. 7, 8, 9 and 10 are each an example of a screen on the user terminal 2. FIGS. 7 and 8 are each an example of the vehicle update menu screen. The vehicle update menu screen is a screen that displays the update menu corresponding to the vehicle 10. For example, when the client application of the vehicle update system 100 is activated, the control unit 21 transmits a menu acquisition request to the center server 1. For example, the user identification information and the position information of the vehicle 10 are also transmitted to the center server 1 together with the menu acquisition request. The vehicle update menu screen is displayed when the control unit 21 of the user terminal 2 receives, from the center server 1, the menu information about the update menu corresponding to the vehicle 10 and the shop information about a shop within a predetermined range of the position of the vehicle 10.

The vehicle update menu screen illustrated in FIG. 7 displays information about the vehicle 10 that is a target of update, and the update menu corresponding to the vehicle 10. A display section for the information about the vehicle 10 as the target (a section "target vehicle" in the drawing) displays the vehicle name, the model code and the body color of the vehicle 10, and the identification information of the vehicle.

Update menus corresponding to the vehicle 10 are listed in a display section for the update menu (a section "select desired menu" in the drawing). A description is displayed in relation to each update menu. A checkbox is provided for each update menu, and when the user checks a checkbox, the update menu corresponding to the checked checkbox is selected as the desired menu. It is possible to select a plurality of update menus.

When a button "next" on the vehicle update menu screen illustrated in FIG. 7 is selected, the control unit 21 of the user terminal 2 extracts a shop where the desired menu can be handled from shop(s), received from the center server 1, present within a predetermined range of the vehicle 10. The control unit 21 causes the screen to shift to a screen illustrated in FIG. 8. The vehicle update menu screen illustrated in FIG. 8 includes an input section for the desired reservation date and a display section for shop(s) where update can be performed.

In the input section for the desired reservation date (a section "desired reservation date" in the drawing), year, month and day of the desired reservation date may be selected from respective drop-down menus. Shops where the update menu selected on the vehicle update menu screen illustrated in FIG. 7 can be handled are listed in the display section for shop(s) where update can be performed (a section "select desired shop" in the drawing). The address of the shop is indicated in the display section for each shop. A radio button is provided for the display section of each shop, and when the user selects a radio button, the shop corresponding to the selected radio button is selected as the desired shop.

When a button "enter" on the vehicle update menu screen illustrated in FIG. 8 is selected, the control unit 21 of the user terminal 2 transmits the update confirmation request to the center server 1. The identification information of the desired menu, the desired reservation date that is input, and the identification information of the desired shop are also transmitted to the center server 1 together with the update confirmation request. Additionally, the vehicle update menu screens illustrated in FIGS. 7 and 8 are merely examples, and configurations of the vehicle update menu screen are not limited to those illustrated in FIGS. 7 and 8.

Figure 9:
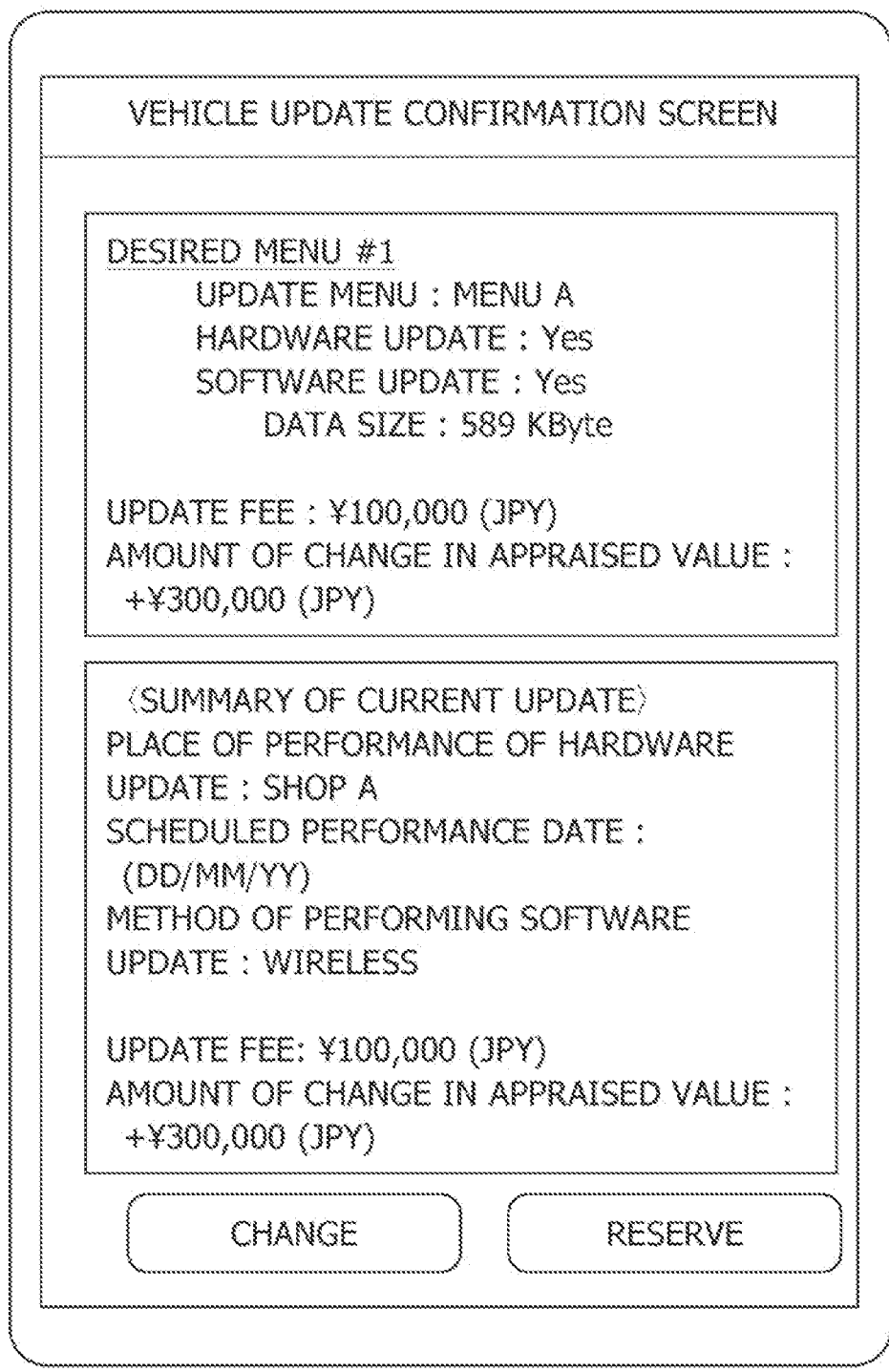
FIG. 9 is an example of a vehicle update confirmation screen on a user terminal.

FIG. 9 is an example of the vehicle update confirmation screen on the user terminal 2. The vehicle update confirmation screen is a screen that displays the detailed information about update in relation to the desired menu. As a response to the update confirmation request, the control unit 21 of the user terminal 2 receives, from the center server 1, the detailed information about update and the identification information of the detailed information about update, for example. The detailed information about update includes the menu information about the desired menu, the shop information about the desired shop, and the method of performing update of software, for example.

The vehicle update confirmation screen illustrated in FIG. 9 displays the menu information about the desired menu and a summary of update. In the example illustrated in FIG. 9, the desired menu is assumed to be menu A. Accordingly, the menu information about menu A is displayed in a display section for the menu information about the desired menu (a section "desired menu #1" in the drawing). In the example illustrated in FIG. 9, as the menu information about menu A, the followings are displayed, namely, there is update of hardware, there is update of software, the amount of data for update of software according to menu A, the fee for update according to menu A, and the amount of change in the appraised value after performing update of menu A. Additionally, in the case where a plurality of update menus are selected as the desired menus, the display section for the menu information is provided for each update menu.

A display section for the summary of update (a section "summary of current update" in the drawing) displays, with respect to the current update, that a place for performing update of hardware is shop A, the scheduled performance date, that the method of performing update of software is through wireless communication, the fee for update, and the amount of change in the appraised value. In the case where there are a plurality of update menus, the fee for update and the amount of change in the appraised value in the display section for the summary of update each indicate a total value for all the menus included in the current update.

The vehicle update confirmation screen includes a change button and a reserve button. When the reserve button is selected, the control unit 21 transmits the reservation request for update to the center server 1, and a reservation for update of the vehicle 10 is made with the contents displayed on the vehicle update confirmation screen.

The change button is a button that is selected to change an information piece included in the detailed information about update displayed on the vehicle update confirmation screen. When the change button is selected, a transition is made to a screen where the desired menu, the desired shop ("place of performance of hardware update" in the drawing), the scheduled performance date, and the method of performing update of software can be changed, for example. When change of any of the desired menu, the desired shop and the scheduled performance date is selected, for example, the screen transitions to the vehicle update menu screen in FIG. 7 or 8. When the desired menu, the desired shop, or the scheduled performance date is newly selected and the enter button (FIG. 8) is selected, the control unit 21 transmits the update confirmation request to the center server 1.

FIG. 10 is an example of a screen for a case where change of the method of performing update of software is selected. In the case where change of the method of performing update of software is selected, options for the method of performing update of software are displayed, on the screen illustrated in FIG. 10, in the display section for the summary of update (the section "summary of current update" in the drawing). The method of performing update of software may be changed by selecting a different method of performance from the options. However, in the case where there are no options for the method of performing update of software, the options are not displayed.

When the reserve button is selected on the vehicle update confirmation screen illustrated as an example in FIG. 10, the control unit 21 of the user terminal 2 transmits a performance method change request to center server 1. For example, the user identification information of the user of the vehicle 10, the identification information of the detailed information about update, and the method of performing update of software specified by the user are also transmitted together with the performance method change request. When the performance method change request is received from the user terminal 2, the control unit 11 of the center server 1 changes the method of performing update of software in the corresponding detailed information about update to the performance method specified by the user, and transmits the detailed information about update after change to the user terminal 2. When the detailed information about update after change is received from the center server 1, the control unit 21 of the user terminal 2 displays the detailed information about update on the vehicle update confirmation screen.

Additionally, in the case where the method of performing update of software is changed from performance through wireless communication to performance at a shop, the control unit 11 of the center server 1 makes an inquiry to the desired shop, and determines whether a reservation for the desired reservation date may be made. In the case where a reservation for the desired reservation date may be made, the control unit 11 of the center server 1 changes the method of performing update of software in the corresponding detailed information about update from performance through wireless communication to performance at the shop, and transmits the detailed information about update after change to the user terminal 2. In the case where it is not possible to make a reservation for the desired reservation date, the control unit 11 of the center server 1 changes the scheduled performance date to a date that can be reserved, changes the method of performing update of software in the corresponding detailed information about update from performance through wireless communication to performance at the shop, and transmits the detailed information about update after change to the user terminal 2. Additionally, the vehicle update menu screen and the vehicle update confirmation screen are not limited to those illustrated in FIGS. 7 to 10, and may be changed as appropriate according to embodiment.

<Flow of Processes>

FIG. 11 is an example of a flowchart of a process performed by the center server 1 in a case where the menu acquisition request is received from the user terminal 2. The process illustrated in FIG. 11 is repeatedly performed every predetermined period of time. Additionally, a main performer of the process illustrated in FIG. 11 is the CPU 101 of the center server 1, but a functional component will be described as the performer for the sake of convenience.

In OP101, the control unit 11 determines whether the menu acquisition request is received from the user terminal 2 or not. In the case where the menu acquisition request is received from the user terminal 2 (OP101: YES), the process proceeds to OP102. In the case where the menu acquisition request is not received from the user terminal 2 (OP101: NO), the process illustrated in FIG. 11 is ended. For example, the user identification information of the user of the user terminal 2 and the position information of the vehicle 10 are also acquired together with the menu acquisition request.

In OP102, the control unit 11 acquires the update menu corresponding to the vehicle 10. Specifically, the control unit 11 first acquires, from the user information DB 13, the vehicle information of the vehicle 10 associated with the user identification information that is received together with the menu acquisition request. Next, the control unit 11 extracts, from the menu information DB 12, the update menu associated with the vehicle name and the like included in the vehicle information of the vehicle 10 that is acquired.

In OP103, the control unit 11 extracts, from the shop information DB 14, a shop that is located within a predetermined range of a position indicated by the position information of the vehicle 10 that is received together with the menu acquisition request. In OP104, the control unit 11 transmits, to the user terminal 2, as a response to the menu acquisition request, the menu information about the update menu corresponding to the vehicle 10 acquired in OP102 and the shop information about a shop that is located within a predetermined range of the position of the vehicle 10 acquired in OP103. The process illustrated in FIG. 11 is then ended.

Figure 12:
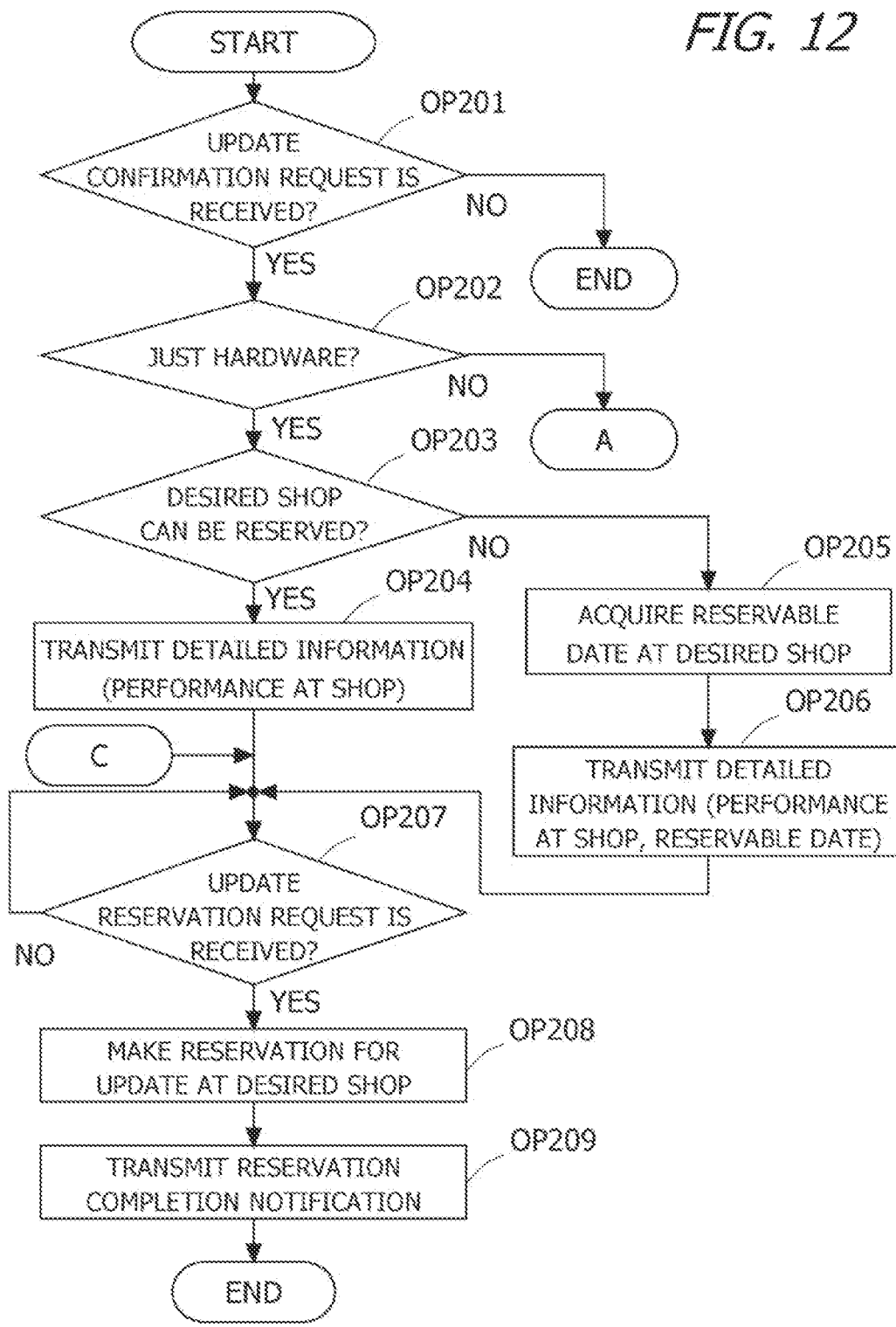
FIG. 12 is an example of a flowchart of a process performed by a center server in a case where a update confirmation request is received from a user terminal.
Figure 13:
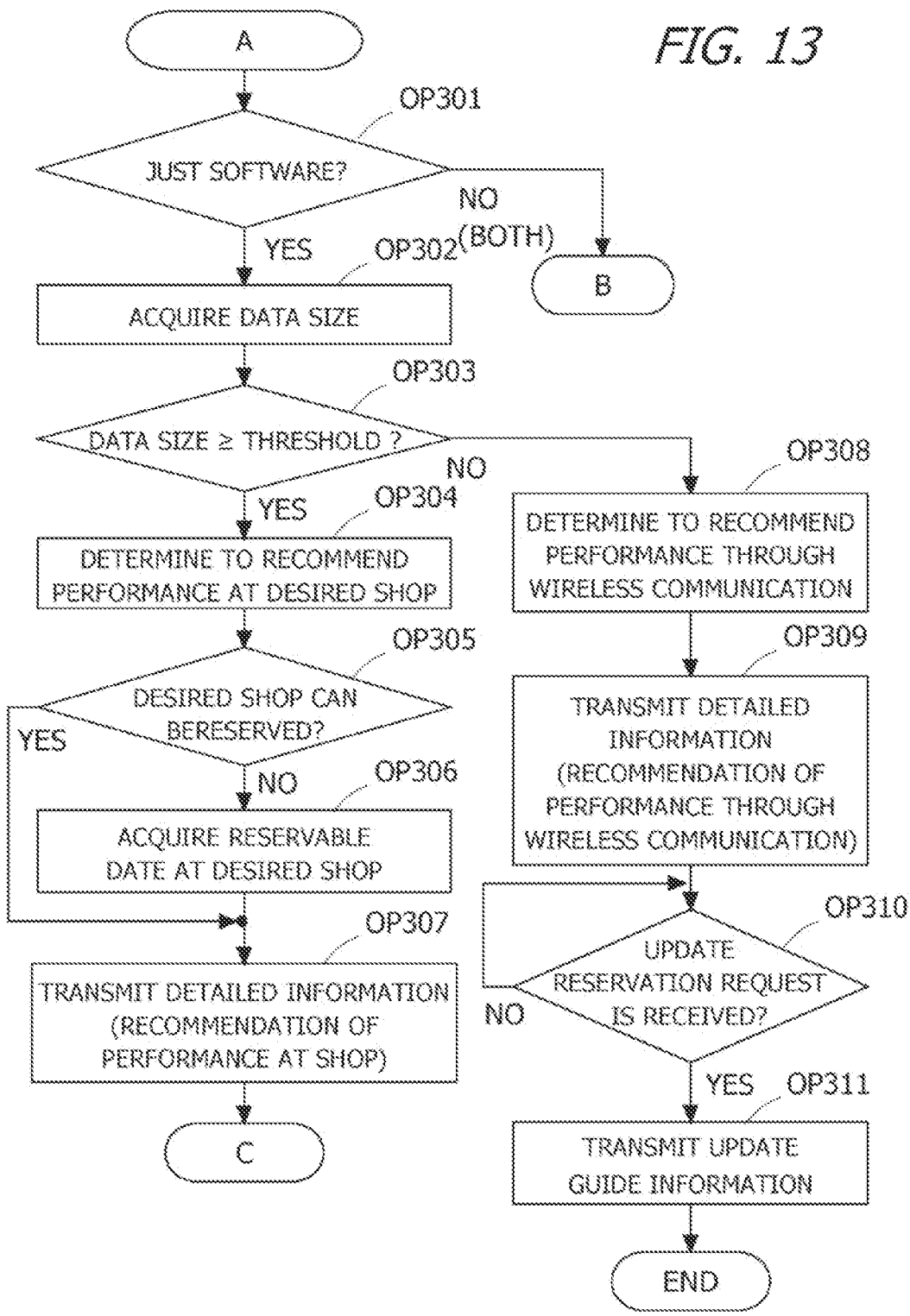
FIG. 13 is an example of a flowchart of a process performed by a center server in a case where a update confirmation request is received from a user terminal.
Figure 14:
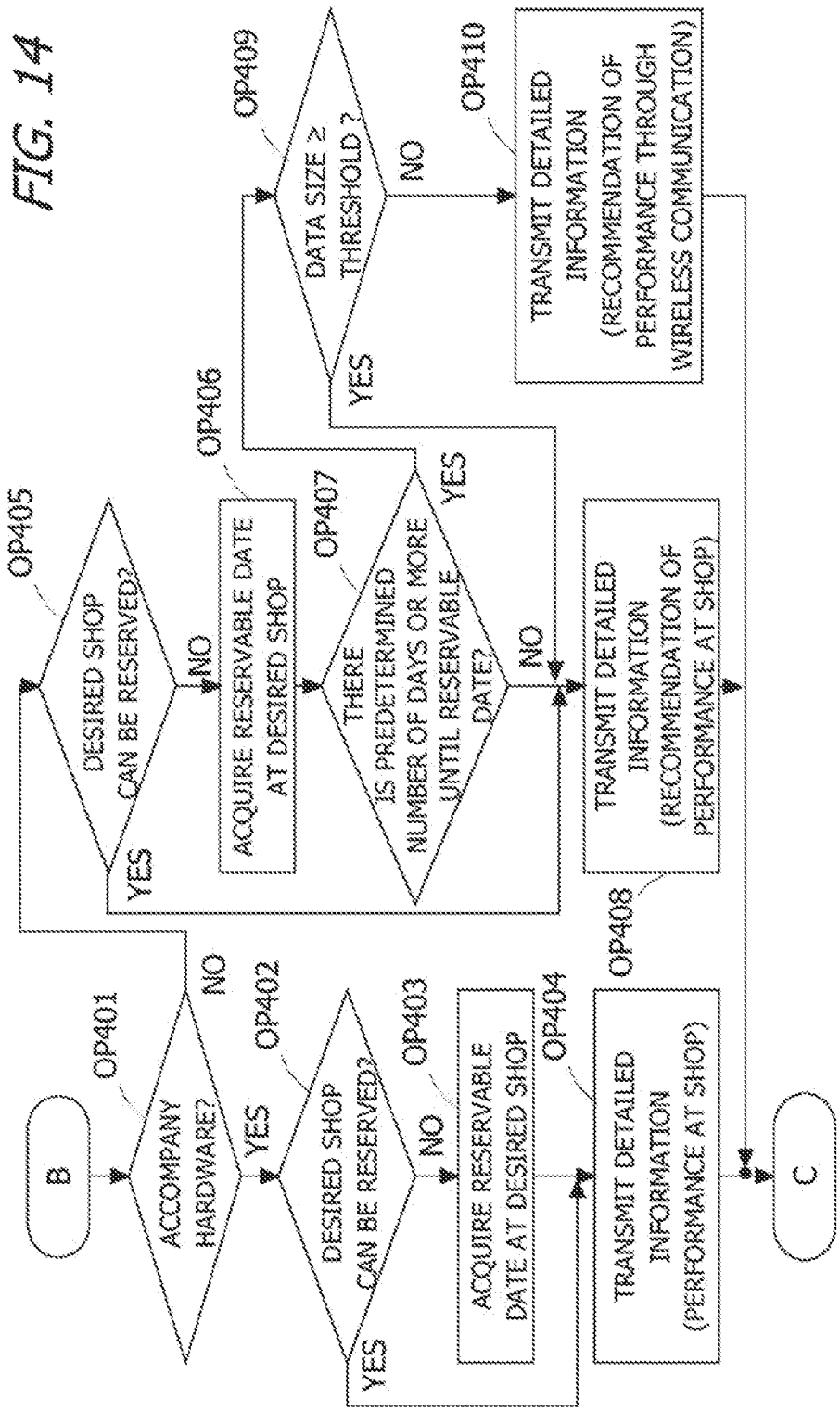
FIG. 14 is an example of a flowchart of a process performed by a center server in a case where a update confirmation request is received from a user terminal.

FIGS. 12, 13 and 14 are each an example of a flowchart of a process performed by the center server 1 in a case where the update confirmation request is received from the user terminal 2. The processes illustrated in FIGS. 12 to 14 are repeatedly performed every predetermined period of time.

In OP201, the control unit 11 determines whether the update confirmation request is received from the user terminal 2 or not. In the case where the update confirmation request is received from the user terminal 2 (OP201: YES), the process proceeds to OP202. In the case where the update confirmation request is not received from the user terminal 2 (OP201: NO), the process illustrated in FIG. 12 is ended. For example, the user identification information of the user of the vehicle 10, the identification information of the desired menu, the identification information of the desired shop, and the desired reservation date are also received together with the update confirmation request.

In OP202, the control unit 11 refers to the menu information DB 12, and determines, based on the identification information of the desired menu, whether update of the vehicle 10 is just for hardware or not. In the case where update of the vehicle 10 is just for hardware (OP202: YES), the process proceeds to OP203. In the case where update of the vehicle 10 is not just for hardware, or in other words, in the case where update of the vehicle 10 is just for software or is for both hardware and software (OP202: NO), the process proceeds to OP301 in FIG. 13.

In OP203, the control unit 11 determines whether the schedule of the desired shop allows a reservation for update of the vehicle 10 on the desired reservation date to be made or not. This determination is performed by making an inquiry to the shop server 4 corresponding to the desired shop, for example. In the case where the schedule of the desired shop allows a reservation for update of the vehicle 10 on the desired reservation date to be made (OP203: YES), the process proceeds to OP204. In the case where the schedule of the desired shop does not allow a reservation for update of the vehicle 10 on the desired reservation date to be made (OP203: NO), the process proceeds to OP205.

In OP204, the control unit 11 transmits the detailed information about update to the user terminal 2. The detailed information about update at this time includes the menu information about the desired menu, the shop information about the desired shop, and the desired reservation date as the scheduled performance date for update, for example.

OP205 and OP206 are processes for a case where the schedule of the desired shop does not allow a reservation for update of the vehicle 10 on the desired reservation date to be made. In OP205, the control unit 11 makes an inquiry to the shop server 4 of the desired shop, and acquires, from a predetermined range including the desired reservation date, a date that can be reserved for update of the vehicle 10. The range from which a date that can be reserved is acquired is one week around the desired reservation date, for example. A plurality of dates may be acquired as the date that can be reserved.

In OP206, the control unit 11 transmits the detailed information about update to the user terminal 2. The detailed information about update at this time includes the menu information about the desired menu, the shop information about the desired shop, and the date that can be reserved that is acquired in OP205, for example.

In OP207, the control unit 11 determines whether the update reservation request is received from the user terminal 2 or not. In the case where the update reservation request is received from the user terminal 2 (OP207: YES), the process proceeds to OP208. In the case where the update reservation request is not received from the user terminal 2 (OP207: NO), a standby state is reached, and the process illustrated in FIG. 12 is ended in a case where the update reservation request is not received after a predetermined period of time.

In OP208, the control unit 11 makes a reservation for update of the vehicle 10 at the shop server 4 of the desired shop. In OP209, the control unit 11 transmits a reservation completion notification to the user terminal 2. The process illustrated in FIG. 12 is then ended.

The process illustrated in FIG. 13 is a process for a case where update of the vehicle 10 is not just for hardware. In OP301, the control unit 11 refers to the menu information DB 12, and determines, based on the identification information of the desired menu, whether update of the vehicle 10 is just for software or not. In the case where update included in the update of the vehicle 10 is just for software (OP301: YES), the process proceeds to OP302. In the case where update of the vehicle 10 is not just for software, or in other words, in the case where update of the vehicle 10 is for both hardware and software (OP301: NO), the process proceeds to OP401 in FIG. 14.

In OP302, the control unit 11 acquires the data size for update of software included in the desired menu. In the case where there are a plurality of desired menus, or in the case where the desired menu includes update of a plurality of pieces of software, the total amount of data for update is acquired as the data size.

In OP303, the control unit 11 determines whether the data size for update of software is equal to or greater than the predetermined threshold or not. In the case where the data size for update of software is equal to or greater than the predetermined threshold (OP303: YES), the process proceeds to OP304. In the case where the data size for update of software is smaller than the predetermined threshold (OP303: NO), the process proceeds to OP308.

The processes from OP304 to OP307 are processes for a case where the data size for update of software is equal to or greater than the predetermined threshold. In OP304, the control unit 11 determines that there are options of performance at a shop and performance through wireless communication for the method of performing update of software, and that performance at a shop is to be recommended.

In OP305, the control unit 11 determines whether the schedule of the desired shop allows a reservation for update of the vehicle 10 on the desired reservation date to be made or not. In the case where the schedule of the desired shop allows a reservation for update of the vehicle 10 on the desired reservation date to be made (OP305: YES), the process proceeds to OP307. In the case where the schedule of the desired shop does not allow a reservation for update of the vehicle 10 on the desired reservation date to be made (OP305: NO), the process proceeds to OP306.

In OP306, the control unit 11 makes an inquiry to the shop server 4 of the desired shop, and acquires, from a predetermined range including the desired reservation date, a date that can be reserved for update of the vehicle 10.

In OP307, the control unit 11 transmits the detailed information about update to the user terminal 2. The detailed information about update at this time includes the menu information about the desired menu, the shop information about the desired shop, the desired reservation date or the reservable date as the scheduled performance date for update, and that the method of performing update of software includes performance at a shop and performance through wireless communication and that performance at a shop is recommended, for example. Then, the process proceeds to OP207 in FIG. 12, and when the update reservation request is received from the user terminal 2 (FIG. 12, OP207), a reservation is made at the shop (FIG. 12, OP208).

Processes from OP308 to OP311 are processes for a case where the data size for update of software is smaller than the predetermined threshold. In OP308, the control unit 11 determines that there are options of performance at a shop and performance through wireless communication for the method of performing update of software, and that performance through wireless communication is to be recommended.

In OP309, the control unit 11 transmits the detailed information about update to the user terminal 2. The detailed information about update at this time includes the menu information about the desired menu, the shop information about the desired shop, the desired reservation date as the scheduled performance date for update, and that the method of performing update of software includes performance at a shop and performance through wireless communication and that performance through wireless communication is recommended, for example.

In OP310, the control unit 11 determines whether the update reservation request is received from the user terminal 2 or not. In the case where the update reservation request is received from the user terminal 2 (OP310: YES), the process proceeds to OP311. In the case where the update reservation request is not received from the user terminal 2 (OP310: NO), a standby state is reached, and the process illustrated in FIG. 13 is ended in a case where the update reservation request is not received after a predetermined period of time.

In OP311, the center server 1 transmits guide information about update of software to the user terminal 2. The guide information about update includes a uniform resource locator (URL) of a download site for update data for target software, and the data size, for example. The process illustrated in FIG. 13 is then ended.

The process illustrated in FIG. 14 is a process for a case where update of the vehicle 10 is for both hardware and software. In OP401, the control unit 11 refers to the menu information DB 12, and determines whether software included in the desired menu accompanies update of hardware or not. In the case where software included in the desired menu accompanies update of hardware (OP401: YES), the process proceeds to OP402. In the case where software included in the desired menu does not accompany update of hardware (OP401: NO), the process proceeds to OP405.

Processes from OP402 to OP404 are processes for a case where software included in the desired menu accompanies update of hardware. In OP402, the control unit 11 determines whether the desired shop may be reversed for the desired reservation date or not. In the case where the desired shop may be reserved for the desired reservation date (OP402: YES), the process proceeds to OP404. In the case where it is not possible to make a reservation at the desired shop for the desired reservation date (OP402: NO), the process proceeds to OP403.

In OP403, the control unit 11 makes an inquiry to the shop server 4 of the desired shop, and acquires, from a predetermined range including the desired reservation date, a date that can be reserved for update of the vehicle 10. In OP404, the control unit 11 transmits the detailed information about update to the user terminal 2. The detailed information about update at this time includes the menu information about the desired menu, the shop information about the desired shop, the desired reservation date or the reservable date as the scheduled performance date for update, and that the method of performing update of software is performance at a shop, for example.

In OP404, because software to be updated accompanies hardware, the software is not usable until update of the hardware is completed even if the software is updated through wireless communication. Accordingly, a notification indicating just performance at a shop as the method of performing update of software is issued. However, such a case is not restrictive, and a notification indicating performance at a shop and performance through wireless communication as the options for the method of performing update of software may be issued, and performance at a shop may be recommended. Then, the process proceeds to OP207 in FIG. 12, and when the update reservation request is received from the user terminal 2 (FIG. 12, OP207) a reservation is made at the shop (FIG. 12, OP208).

Process from OP405 to OP410 are processes for a case where software included in the desired menu does not accompany update of hardware. In OP405, the control unit 11 determines whether the schedule of the desired shop allows a reservation for update of the vehicle 10 on the desired reservation date to be made or not. In the case where the schedule of the desired shop allows a reservation for update of the vehicle 10 on the desired reservation date to be made (OP405: YES), the process proceeds to OP408. In the case where the schedule of the desired shop does not allow a reservation for update of the vehicle 10 on the desired reservation date to be made (OP405: NO), the process proceeds to OP406. In OP406, the control unit 11 makes an inquiry to the shop server 4 of the desired shop, and acquires, from a predetermined range including the desired reservation date, a date that can be reserved for update of the vehicle 10.

In OP407, the control unit 11 determines whether the number of days between the desired reservation date and an earliest date when the desired shop can be reserved is a predetermined number of days or more or not. The predetermined number of days is one week, for example. In the case where the number of days between the desired reservation date and the earliest date when the desired shop can be reserved is the predetermined number of days or more (OP407: YES), the process proceeds to OP409. In the case where the number of days between the desired reservation date and the earliest date when the desired shop can be reserved is smaller than the predetermined number of days (OP407: NO), the process proceeds to OP408.

In OP408, the control unit 11 transmits the detailed information about update to the user terminal 2. The detailed information about update at this time includes the menu information about the desired menu, the shop information about the desired shop, the desired reservation date or the reservable date as the scheduled performance date for update, and that the method of performing update of software includes performance at a shop and performance through wireless communication and that performance at a shop is recommended, for example. Then, the process proceeds to OP207 in FIG. 12, and when the update reservation request is received from the user terminal 2 (FIG. 12, OP207), a reservation is made at the shop (FIG. 12, OP208).

In OP409, the control unit 11 determines whether the data size for update of software is equal to or greater than the predetermined threshold or not. In the case where the data size for update of software is equal to or greater than the predetermined threshold (OP409: YES), the process proceeds to OP408. In the case where the data size for update of software is smaller than the predetermined threshold (OP409: NO), the process proceeds to OP410.

In OP410, the control unit 11 transmits the detailed information about update to the user terminal 2. The detailed information about update at this time includes the menu information about the desired menu, the shop information about the desired shop, the reservable date as the scheduled performance data for update, and that the method of performing update of software includes performance at a shop and performance through wireless communication and that performance through wireless communication is recommended, for example. Then, the process proceeds to OP207 in FIG. 12, and when the update reservation request is received from the user terminal 2 (FIG. 12, OP207), a reservation is made at the shop (FIG. 12, OP208).

Additionally, in the processes illustrated in FIGS. 12 to 14, in the case where, after the detailed information about update is transmitted to the user terminal 2 (OP204 and OP206 in FIGS. 12, OP307 and OP309 in FIG. 13, OP404, OP408 and OP410 in FIG. 14), any of the desired menu, the desired shop, the desired reservation date, and the method of performing update of software is changed by the user, the update confirmation request or the performance method change request is transmitted again from the user terminal 2. Accordingly, the center server 1 makes a negative determination in the process of determining reception of the reservation request for update from the user terminal 2 (OP207 in FIG. 12, OP310 in FIG. 13).

In the case where any of the desired menu, the desired shop, and the desired reservation date is changed by the user, the update confirmation request is received again from the user terminal 2, and the center server 1 performs the process from OP101 in FIG. 12, for example. In the case where the method of performing update of software is changed by the user, the performance method change request is received from the user terminal 2, and the control unit 11 of the center server 1 determines whether a reservation for update of software may be made at the desired shop for the desired reservation date in the corresponding detailed information about update or not. In the case where a reservation for update of software may be made at the desired shop for the desired reservation date, the control unit 11 of the center server 1 changes the method of performance in the corresponding detailed information about update to the method specified by the user. In the case where it is not possible to make a reservation for update of software at the desired shop for the desired reservation date, the control unit 11 of the center server 1 acquires the reservable date from the shop server 4 of the desired shop, changes the scheduled performance date in the corresponding detailed information about update to the reservable date, and changes the method of performing update of software to the method specified by the user. The detailed information about update after change is transmitted to the user terminal 2, and the center server 1 performs the process of determining whether the reservation request for update is received from the user terminal 2 in the manner of the process in OP207 in FIG. 12.

Operations and Effects of First Embodiment

According to the first embodiment, a system that is capable of updating hardware of the vehicle 10 may present, in a case where there is a request for update of the vehicle 10, a suitable performance method according to whether an update target is hardware or software.

In the case where the desired menu includes update of software, because options of performance at a shop and performance through wireless communication are presented in relation to update of software, the user may select a convenient option. Furthermore, the method of performing update of software to be presented or recommended is determined based on at least one of the data size for update of software, whether software accompanies update of hardware, and the number of days until the shop can be reserved. A most suitable update method for software may thus be presented or recommended according to the contents of the desired menu or a situation.

In the first embodiment, information about the appraised value, and a fee for update of the vehicle are also transmitted to the user terminal as detailed information pieces about update of the vehicle 10. The user is thus provided with materials based on which the user may determine whether to perform update of the vehicle 10. For example, when a difference between an amount of increase in the appraised value and the fee is great, the user is highly likely encouraged to determine to perform update of the vehicle 10.

OTHER EMBODIMENTS

The embodiments described above are examples, and the present disclosure may be changed and carried out as appropriate without departing from the gist of the present disclosure.

In the first embodiment, in the case where the update menu for the vehicle 10 includes update of both hardware and software, the method of performing update of software to be recommended is determined based on whether the software accompanies the hardware, whether the schedule of a shop is available, and whether the total amount of data for update of the software is equal to or greater than a predetermined threshold. However, such a case is not restrictive, and the method of performing update of software to be recommended may be determined based on whether the software accompanies the hardware. Alternatively, the method of performing update of software to be recommended may be determined based on whether the schedule of a shop is available or not. Furthermore, the method of performing update of software to be recommended may be determined based on whether the total amount of data for update of the software is equal to or greater than a predetermined threshold or not.

In the case where the update menu for the vehicle 10 includes update of a plurality of pieces of software, the method of performing update to be presented or recommended may be determined for each piece of software. This allows the method of performing update of software to be more flexibly presented according to the contents of the update menu for the vehicle 10.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A computer networking apparatus comprising a processor is configured to:
    receive, from a user terminal, a request for a first maintenance regarding a first vehicle,
    notify the user terminal that the first maintenance is to be performed at an auto-repair garage, when the first maintenance is addition or change of auto parts,
    notify the user terminal that the first maintenance is to be performed through wireless communication, when the first maintenance is update of a control program or an application program, and
    when the first maintenance comprises the addition or the change of the auto parts and the update of the control program or the application program, allow selection of whether the update of one or more pieces of the control program or the application program included in the first maintenance is to be performed at the auto-repair garage or through the wireless communication.

2. An information processing apparatus comprising a processor is configured to:
    receive, from a user terminal, a request for a first update regarding a first vehicle,
    notify the user terminal that the first update is to be performed at a shop, when the first update is a hardware update,
    notify the user terminal that the first update is to be performed through wireless communication, when the first update is a software update, and
    when the first update comprises both the hardware update and the software update, allow selection of whether an update of one or more pieces of first software included in the first update is to be performed at the shop or through the wireless communication.

3. The information processing apparatus according to claim 2, wherein the processor is configured to
    recommend to perform the software update at the shop, when the first update comprises the software update and a total amount of data for the software update is equal to or greater than a predetermined threshold, and
    recommend to perform the software update through the wireless communication, when the first update the software update and the total amount of data is smaller than the predetermined threshold.

4. The information processing apparatus according to claim 2, wherein the processor is configured to
    notify that the software update is to be performed at the shop, when the first update comprises both the hardware update and the software update, and the update of at least one of the one or more pieces of the first software accompanies the update of first hardware included in the first update, and
    recommend to perform the software update through the wireless communication, when the first update comprises both the hardware update and the software update, and the update of none of the one or more pieces of the first software accompanies the update of the first hardware.

5. The information processing apparatus according to claim 2, wherein the processor is configured to
    recommend to perform the update of the one or more pieces of the first software at the shop, when the first update comprises both the hardware update and the software update, and a schedule of a first shop where the first update is scheduled to be performed allows the first update to be performed within a predetermined number of days from a date specified by the user terminal, and
    recommend to perform the update of the one or more pieces of the first software through the wireless communication, when the first update comprises both the hardware update and the software update, and the schedule of the first shop is not available until after the predetermined number of days from the date specified by the user terminal.

6. The information processing apparatus according to claim 2, wherein the processor is configured to recommend that the update of the one or pieces of the first software is to be performed at the shop, when the first update comprises both the hardware update and the software update, and at least one of cases is satisfied, the cases comprising (1) a case where the update of at least one of the one or more pieces of the first software accompanies the update of first hardware included in the first update, (2) a case where the first update is possible to perform within a predetermined number of days from a date specified by the user terminal, and (3) a case where a total amount of data for the update of the one or more pieces of the first software is equal to or greater than a predetermined threshold.

7. The information processing apparatus according to claim 2, wherein, when the first update comprises both the hardware update and the software update, and there is more than one piece of the first software, the processor is configured to determine whether to recommend to perform the update at the shop or through the wireless communication, with respect to each of the more than one piece of the first software.

8. The information processing apparatus according to claim 2, wherein hardware to be added or changed by the first update comes with a warranty from a manufacturer of the first vehicle.

9. The information processing apparatus according to claim 2, wherein the processor is configured to transmit, to the user terminal, information about an appraised value of the first vehicle after performing the first update.

10. The information processing apparatus according to claim 2, wherein the processor is configured to transmit, to the user terminal, information about a fee for the first update.

11. The information processing apparatus according to claim 2, wherein, when the software update is included in the first update, the processor is configured to transmit, to the user terminal, a total amount of data for the update of at least one or more pieces of first software included in the first update.

12. An information processing method executed by a computer comprising:
    receiving, from a user terminal, a request for a first update regarding a first vehicle;
    notifying the user terminal that the first update is to be performed at a shop, when the first update is a hardware update;
    notifying the user terminal that the first update is to be performed through wireless communication, when the first update is a software update; and when the first update comprises both the hardware update and the software update, allowing selection of whether an update of one or more pieces of first software included in the first update is to be performed at the shop or through the wireless communication.

13. The information processing method according to claim 12, further comprising:
recommending to perform the update of the one or more pieces of the first software at the shop, when the first update comprises at least the software update and a total amount of data for the update of the one or more pieces of the first software is equal to or greater than a predetermined threshold, and
recommending to perform the update of the one or more pieces of the first software through the wireless communication, when the first update comprises at least the software update and the total amount of data is smaller than the predetermined threshold.

14. The information processing method according to claim 12, further comprising:
notifying that update of the one or more pieces of the first software is to be performed at the shop, when the first update comprises both the hardware update and the software update, and the update of at least one of the one or more pieces of the first software accompanies the update of first hardware included in the first update, and
recommending to perform the update of the one or more pieces of the first software through the wireless communication, when the first update comprises both the hardware update and the software update, and the update of none of the one or more pieces of the first software accompanies the update of the first hardware.

15. The information processing method according to claim 12, further comprising:
recommending to perform the update of the one or more pieces of the first software at the shop, when the first update comprises both the hardware update and the software update, and a schedule of a first shop where the first update is scheduled to be performed allows the first update to be performed within a predetermined number of days from a date specified by the user terminal, and
recommending to perform the update of the one or more pieces of the first software through the wireless communication, when the first update comprises both the hardware update and the software update, and the schedule of the first shop is not available until after the predetermined number of days from the date specified by the user terminal.

16. The information processing method according to claim 12, further comprising:
recommending to perform the update of the one or more pieces of the first software at the shop, when the first update comprises both the hardware update and the software update, and at least one of cases is satisfied, the cases comprising (1) a case where the update of at least one of the one or more pieces of the first software accompanies the update of first hardware included in the first update, (2) a case where the first update is possible to perform within a predetermined number of days from a date specified by the user terminal, and (3) a case where a total amount of data for the update of the one or more pieces of the first software is equal to or greater than a predetermined threshold.

17. The information processing method according to claim 12, further comprising:
when the first update comprises both the hardware update and the software update, and there is more than one piece of the first software, determining whether to recommend to perform the update at the shop or through the wireless communication, with respect to each of the more than one piece of the first software.

18. The information processing method according to claim 12, wherein hardware to be added or changed by the first update comes with a warranty from a manufacturer of the first vehicle.

* * * * *

UNITED STATES PATENT AND TRADEMARK OFFICE
CERTIFICATE OF CORRECTION

PATENT NO. : 11,972,246 B2
APPLICATION NO. : 17/720531
DATED : April 30, 2024
INVENTOR(S) : Yuta Tone et al.

It is certified that error appears in the above-identified patent and that said Letters Patent is hereby corrected as shown below:

In the Claims

In Claim 3, Column 25, Line 51, delete "wireless communication, when the first update the" and insert -- wireless communication, when the first update comprises the --

Signed and Sealed this
Sixteenth Day of July, 2024

Katherine Kelly Vidal
*Director of the United States Patent and Trademark Office*